United States Patent [19]
Ozawa et al.

[11] Patent Number: 6,154,248
[45] Date of Patent: Nov. 28, 2000

[54] ELECTRONIC ENDOSCOPE

[75] Inventors: Ryo Ozawa; Kouhei Iketani, both of Tokyo, Japan

[73] Assignee: Asahi Kogaku Kogyo Kabushiki Kaisha, Tokyo, Japan

[21] Appl. No.: 08/863,080

[22] Filed: May 23, 1997

[30] Foreign Application Priority Data

May 24, 1996 [JP] Japan .................................. 8-153171

[51] Int. Cl.[7] ...................................................... A62B 1/04
[52] U.S. Cl. .............................................. 348/65; 348/71
[58] Field of Search .................................. 348/45, 46, 49, 348/64, 65, 66, 69, 70, 71, 77, 262, 263, 441, 453, 445, 457; 382/128; 358/310; 364/526; A62B 1/04

[56] References Cited

U.S. PATENT DOCUMENTS

| | | | |
|---|---|---|---|
| 5,130,935 | 7/1992 | Takiguchi | 364/526 |
| 5,303,060 | 4/1994 | Iwamura et al. | 358/310 |
| 5,408,265 | 4/1995 | Sasaki | 348/70 |
| 5,485,203 | 1/1996 | Nakamura et al. | 348/263 |
| 5,515,449 | 5/1996 | Tsuruoka et al. | 382/128 |
| 5,657,082 | 8/1997 | Harada et al. | 348/262 |
| 5,812,187 | 9/1998 | Watanabe | 348/70 |

*Primary Examiner*—Howard Britton
*Assistant Examiner*—Tung Vo
*Attorney, Agent, or Firm*—Greenblum & Bernstein, P.L.C.

[57] ABSTRACT

An electronic endoscope has an image sensor for converting an optical image into analog electric image-pixel signals, and an analog-to-digital converter for converting the analog electric image-pixel signals into digital electric image-pixel signals on the basis of a first series of clock pulses. A number of the converted digital electric image-pixel signals included in a one-horizontal-scanning-line being is based upon a frequency of the first series of clock pulses. The endoscope has a pixel-number converter for converting the number of the converted digital electric image-pixel signals into another number of digital image-pixel signals so as to enable the digital electric image-pixel signals to be externally outputted on the basis of a second series of clock pulses having a frequency different from that of the first clock pulses.

53 Claims, 28 Drawing Sheets

FIG. 8 kdn           1−kdn 17 pixels:
$[X(35n-17)*0/8]+[X(35(n-1)+17)*8/8]=X'(35n-17)$
$[X(35n-16)*0/8]+[X(35n-17)*8/8]=X'(35n-16)$
$[X(35n-15)*1/8]+[X(35n-16)*7/8]=X'(35n-15)$
$[X(35n-14)*1/8]+[X(35n-15)*7/8]=X'(35n-14)$
$[X(35n-13)*2/8]+[X(35n-14)*6/8]=X'(35n-13)$
$[X(35n-12)*2/8]+[X(35n-13)*6/8]=X'(35n-12)$
$[X(35n-11)*3/8]+[X(35n-12)*5/8]=X'(35n-11)$
$[X(35n-10)*3/8]+[X(35n-11)*5/8]=X'(35n-10)$
$[X(35n-\ 9)*4/8]+[X(35n-10)*4/8]=X'(35n-\ 9)$
$[X(35n-\ 8)*4/8]+[X(35n-\ 9)*4/8]=X'(35n-\ 8)$
$[X(35n-\ 7)*5/8]+[X(35n-\ 8)*3/8]=X'(35n-\ 7)$
$[X(35n-\ 6)*5/8]+[X(35n-\ 7)*3/8]=X'(35n-\ 6)$
$[X(35n-\ 5)*6/8]+[X(35n-\ 6)*2/8]=X'(35n-\ 5)$
$[X(35n-\ 4)*6/8]+[X(35n-\ 5)*2/8]=X'(35n-\ 4)$
$[X(35n-\ 3)*7/8]+[X(35n-\ 4)*1/8]=X'(35n-\ 3)$
$[X(35n-\ 2)*7/8]+[X(35n-\ 3)*1/8]=X'(35n-\ 2)$
$[X(35n-\ 1)*8/8]+[X(35n-\ 2)*0/8]=X'(35n-\ 1)$ 35 pixels:
$[X(35n-\ 0)*8/8]+[X(35n+\ 1)*0/8]=X'(35n-\ 0)$ 18 pixels:
$[X(35n+\ 1)*8/8]+[X(35n+\ 2)*0/8]=X'(35n+\ 1)$
$[X(35n+\ 2)*7/8]+[X(35n+\ 3)*1/8]=X'(35n+\ 2)$
$[X(35n+\ 3)*7/8]+[X(35n+\ 4)*1/8]=X'(35n+\ 3)$
$[X(35n+\ 4)*6/8]+[X(35n+\ 5)*2/8]=X'(35n+\ 4)$
$[X(35n+\ 5)*6/8]+[X(35n+\ 6)*2/8]=X'(35n+\ 5)$
$[X(35n+\ 6)*5/8]+[X(35n+\ 7)*3/8]=X'(35n+\ 6)$
$[X(35n+\ 7)*5/8]+[X(35n+\ 8)*3/8]=X'(35n+\ 7)$
$[X(35n+\ 8)*4/8]+[X(35n+\ 9)*4/8]=X'(35n+\ 8)$
$[X(35n+\ 9)*4/8]+[X(35n+10)*4/8]=X'(35n+\ 9)$
$[X(35n+10)*3/8]+[X(35n+11)*5/8]=X'(35n+10)$
$[X(35n+11)*3/8]+[X(35n+12)*5/8]=X'(35n+11)$
$[X(35n+12)*2/8]+[X(35n+13)*6/8]=X'(35n+12)$
$[X(35n+13)*2/8]+[X(35n+14)*6/8]=X'(35n+13)$
$[X(35n+14)*1/8]+[X(35n+15)*7/8]=X'(35n+14)$
$[X(35n+15)*1/8]+[X(35n+16)*7/8]=X'(35n+15)$
$[X(35n+16)*0/8]+[X(35n+17)*8/8]=X'(35n+16)$
$[X(35n+17)*0/8]+[X(35(n+1)-17)*8/8]=X'(35n+17)$

FIG. 16

$$\begin{array}{c} \text{kup} \qquad\qquad\qquad 1-\text{kup} \\ [X(11n+\ 0)*0/8]+[X(11n+\ 1)\ *8/8]=X'(11n+\ 0) \\ [X(11n+\ 1)*1/8]+[X(11n+\ 2)\ *7/8]=X'(11n+\ 1) \\ [X(11n+\ 2)*1/8]+[X(11n+\ 3)\ *7/8]=X'(11n+\ 2) \\ [X(11n+\ 3)*2/8]+[X(11n+\ 4)\ *6/8]=X'(11n+\ 3) \\ [X(11n+\ 4)*3/8]+[X(11n+\ 5)\ *5/8]=X'(11n+\ 4) \\ [X(11n+\ 5)*4/8]+[X(11n+\ 6)\ *4/8]=X'(11n+\ 5) \\ [X(11n+\ 6)*5/8]+[X(11n+\ 7)\ *3/8]=X'(11n+\ 6) \\ [X(11n+\ 7)*6/8]+[X(11n+\ 8)\ *2/8]=X'(11n+\ 7) \\ [X(11n+\ 8)*7/8]+[X(11n+\ 9)\ *1/8]=X'(11n+\ 8) \\ [X(11n+\ 9)*7/8]+[X(11n+10)\ *1/8]=X'(11n+\ 9) \\ [X(11n+10)*8/8]+[X(11(n+\ 1)+0)*0/8]=X'(11n+10) \end{array}$$

11 pixels

FIG. 22

|  | kfn | 1−kfn |  |
|---|---|---|---|
| ↑ ↑ | [X(59n+ 0)*1.000]+[X(59n+ 1) | *0.000]=X'(59n+ 0) | |
| | [X(59n+ 1)*0.875]+[X(59n+ 2) | *0.125]=X'(59n+ 1) | |
| | [X(59n+ 2)*0.750]+[X(59n+ 3) | *0.250]=X'(59n+ 2) | |
| | [X(59n+ 3)*0.750]+[X(59n+ 4) | *0.250]=X'(59n+ 3) | |
| | [X(59n+ 4)*0.625]+[X(59n+ 5) | *0.375]=X'(59n+ 4) | |
| 12 pixels | [X(59n+ 5)*0.500]+[X(59n+ 6) | *0.500]=X'(59n+ 5) | |
| | [X(59n+ 6)*0.375]+[X(59n+ 7) | *0.625]=X'(59n+ 6) | |
| | [X(59n+ 7)*0.375]+[X(59n+ 8) | *0.625]=X'(59n+ 7) | |
| | [X(59n+ 8)*0.250]+[X(59n+ 9) | *0.750]=X'(59n+ 8) | |
| | [X(59n+ 9)*0.125]+[X(59n+10) | *0.875]=X'(59n+ 9) | |
| ↓ | [X(59n+10)*0.000]+[X(59n+11) | *1.000]=X'(59n+10) | |
| ↑ | [X(59n+11)*0.000]+[X(59n+12) | *1.000]=X'(59n+11) | → eliminate |
| | [X(59n+12)*1.000]+[X(59n+13) | *0.000]=X'(59n+12) | |
| | [X(59n+13)*0.875]+[X(59n+14) | *0.125]=X'(59n+13) | |
| | [X(59n+14)*0.750]+[X(59n+15) | *0.250]=X'(59n+14) | |
| | [X(59n+15)*0.750]+[X(59n+16) | *0.250]=X'(59n+15) | |
| | [X(59n+16)*0.625]+[X(59n+17) | *0.375]=X'(59n+16) | |
| 12 pixels | [X(59n+17)*0.500]+[X(59n+18) | *0.500]=X'(59n+17) | |
| | [X(59n+18)*0.375]+[X(59n+19) | *0.625]=X'(59n+18) | |
| | [X(59n+19)*0.375]+[X(59n+20) | *0.625]=X'(59n+19) | |
| | [X(59n+20)*0.250]+[X(59n+21) | *0.750]=X'(59n+20) | |
| | [X(59n+21)*0.125]+[X(59n+22) | *0.875]=X'(59n+21) | |
| ↓ | [X(59n+22)*0.000]+[X(59n+23) | *1.000]=X'(59n+22) | |
| ↑ | [X(59n+23)*0.000]+[X(59n+24) | *1.000]=X'(59n+23) | → eliminate |
| | [X(59n+24)*1.000]+[X(59n+25) | *0.000]=X'(59n+24) | |
| | [X(59n+25)*0.875]+[X(59n+26) | *0.125]=X'(59n+25) | |
| | [X(59n+26)*0.750]+[X(59n+27) | *0.250]=X'(59n+26) | |
| | [X(59n+27)*0.750]+[X(59n+28) | *0.250]=X'(59n+27) | |
| | [X(59n+28)*0.625]+[X(59n+29) | *0.375]=X'(59n+28) | |
| 12 pixels | [X(59n+29)*0.500]+[X(59n+30) | *0.500]=X'(59n+29) | |
| | [X(59n+30)*0.375]+[X(59n+31) | *0.625]=X'(59n+30) | |
| | [X(59n+31)*0.375]+[X(59n+32) | *0.625]=X'(59n+31) | |
| | [X(59n+32)*0.250]+[X(59n+33) | *0.750]=X'(59n+32) | |
| | [X(59n+33)*0.125]+[X(59n+34) | *0.875]=X'(59n+33) | |
| | [X(59n+34)*0.000]+[X(59n+35) | *1.000]=X'(59n+34) | |
| ↓ | [X(59n+35)*0.000]+[X(59n+36) | *1.000]=X'(59n+35) | → eliminate |

59 pixels

FIG. 23

|  | kfn | 1−kfn |
|---|---|---|

```
              ┌  [X(59n+36)*1.000]+[X(59n+37) *0.000]=X'(59n+36)
              │  [X(59n+37)*0.875]+[X(59n+38) *0.125]=X'(59n+37)
              │  [X(59n+38)*0.750]+[X(59n+39) *0.250]=X'(59n+38)
              │  [X(59n+39)*0.750]+[X(59n+40) *0.250]=X'(59n+39)
              │  [X(59n+40)*0.625]+[X(59n+41) *0.375]=X'(59n+40)
  12 pixels   │  [X(59n+41)*0.500]+[X(59n+42) *0.500]=X'(59n+41)
              │  [X(59n+42)*0.375]+[X(59n+43) *0.625]=X'(59n+42)
              │  [X(59n+43)*0.375]+[X(59n+44) *0.625]=X'(59n+43)
              │  [X(59n+44)*0.250]+[X(59n+45) *0.750]=X'(59n+44)
              │  [X(59n+45)*0.125]+[X(59n+46) *0.875]=X'(59n+45)
              │  [X(59n+46)*0.000]+[X(59n+47) *1.000]=X'(59n+46)
              └  [X(59n+47)*0.000]+[X(59n+48) *1.000]=X'(59n+47) → eliminate
              ┌  [X(59n+48)*1.000]+[X(59n+49) *0.000]=X'(59n+48)
              │  [X(59n+49)*0.875]+[X(59n+50) *0.125]=X'(59n+49)
              │  [X(59n+50)*0.750]+[X(59n+51) *0.250]=X'(59n+50)
              │  [X(59n+51)*0.750]+[X(59n+52) *0.250]=X'(59n+51)
              │  [X(59n+52)*0.625]+[X(59n+53) *0.375]=X'(59n+52)
  11 pixels   │  [X(59n+53)*0.500]+[X(59n+54) *0.500]=X'(59n+53)
              │  [X(59n+54)*0.375]+[X(59n+55) *0.625]=X'(59n+54)
              │  [X(59n+55)*0.375]+[X(59n+56) *0.625]=X'(59n+55)
              │  [X(59n+56)*0.250]+[X(59n+57) *0.750]=X'(59n+56)
              │  [X(59n+57)*0.125]+[X(59n+58) *0.875]=X'(59n+57)
              └  [X(59n+58)*0.000]+[X(59(n+1)+ 0)*1.000]=X'(59n+58) → eliminate
```

FIG. 26

|  | kwp | 1−kwp |  |
|---|---|---|---|
| ↑ 5 pixels | [X(91n+ 0)*1.000]+[X(91n+ 1) | *0.000]=X'(91n+ 0) | |
| | [X(91n+ 1)*0.750]+[X(91n+ 2) | *0.250]=X'(91n+ 1) | |
| | [X(91n+ 2)*0.500]+[X(91n+ 3) | *0.500]=X'(91n+ 2) | |
| | [X(91n+ 3)*0.250]+[X(91n+ 4) | *0.750]=X'(91n+ 3) | |
| ↓ | [X(91n+ 4)*0.000]+[X(91n+ 5) | *1.000]=X'(91n+ 4) | → eliminate |
| 5 pixels | [X(91n+ 5)*1.000]+[X(91n+ 6) | *0.000]=X'(91n+ 5) | |
| | [X(91n+ 6)*0.750]+[X(91n+ 7) | *0.250]=X'(91n+ 6) | |
| | [X(91n+ 7)*0.500]+[X(91n+ 8) | *0.500]=X'(91n+ 7) | |
| | [X(91n+ 8)*0.250]+[X(91n+ 9) | *0.750]=X'(91n+ 8) | |
| | [X(91n+ 9)*0.000]+[X(91n+10) | *1.000]=X'(91n+ 9) | → eliminate |
| 5 pixels | [X(91n+10)*1.000]+[X(91n+11) | *0.000]=X'(91n+10) | |
| | [X(91n+11)*0.750]+[X(91n+12) | *0.250]=X'(91n+11) | |
| | [X(91n+12)*0.500]+[X(91n+13) | *0.500]=X'(91n+12) | |
| | [X(91n+13)*0.250]+[X(91n+14) | *0.750]=X'(91n+13) | |
| | [X(91n+14)*0.000]+[X(91n+15) | *1.000]=X'(91n+14) | → eliminate |
| 4 pixels | [X(91n+15)*1.000]+[X(91n+16) | *0.000]=X'(91n+15) | |
| | [X(91n+16)*0.625]+[X(91n+17) | *0.375]=X'(91n+16) | |
| | [X(91n+17)*0.250]+[X(91n+18) | *0.750]=X'(91n+17) | |
| | [X(91n+18)*0.000]+[X(91n+19) | *1.000]=X'(91n+18) | → eliminate |
| 5 pixels | [X(91n+19)*1.000]+[X(91n+20) | *0.000]=X'(91n+19) | |
| | [X(91n+20)*0.750]+[X(91n+21) | *0.250]=X'(91n+20) | |
| | [X(91n+21)*0.500]+[X(91n+22) | *0.500]=X'(91n+21) | |
| | [X(91n+22)*0.250]+[X(91n+23) | *0.750]=X'(91n+22) | |
| | [X(91n+23)*0.000]+[X(91n+24) | *1.000]=X'(91n+23) | → eliminate |
| 5 pixels | [X(91n+24)*1.000]+[X(91n+25) | *0.000]=X'(91n+24) | |
| | [X(91n+25)*0.750]+[X(91n+26) | *0.250]=X'(91n+25) | |
| | [X(91n+26)*0.500]+[X(91n+27) | *0.500]=X'(91n+26) | |
| | [X(91n+27)*0.250]+[X(91n+28) | *0.750]=X'(91n+27) | |
| | [X(91n+28)*0.000]+[X(91n+29) | *1.000]=X'(91n+28) | → eliminate |
| 5 pixels | [X(91n+29)*1.000]+[X(91n+30) | *0.000]=X'(91n+29) | |
| | [X(91n+30)*0.750]+[X(91n+31) | *0.250]=X'(91n+30) | |
| | [X(91n+31)*0.500]+[X(91n+32) | *0.500]=X'(91n+31) | |
| | [X(91n+32)*0.250]+[X(91n+33) | *0.750]=X'(91n+32) | |
| | [X(91n+33)*0.000]+[X(91n+34) | *1.000]=X'(91n+33) | → eliminate |
| 5 pixels | [X(91n+34)*1.000]+[X(91n+35) | *0.000]=X'(91n+34) | |
| | [X(91n+35)*0.750]+[X(91n+36) | *0.250]=X'(91n+35) | |
| | [X(91n+36)*0.500]+[X(91n+37) | *0.500]=X'(91n+36) | |
| | [X(91n+37)*0.250]+[X(91n+38) | *0.750]=X'(91n+37) | |
| | [X(91n+38)*0.000]+[X(91n+39) | *1.000]=X'(91n+38) | → eliminate |
| 4 pixels | [X(91n+39)*1.000]+[X(91n+40) | *0.000]=X'(91n+39) | |
| | [X(91n+40)*0.625]+[X(91n+41) | *0.375]=X'(91n+40) | |
| | [X(91n+41)*0.250]+[X(91n+42) | *0.750]=X'(91n+41) | |
| | [X(91n+42)*0.000]+[X(91n+43) | *1.000]=X'(91n+42) | → eliminate |

91 pixels

FIG. 27

|  | kwp | 1−kwp |  |
|---|---|---|---|
|  | [X(91n+43)*1.000]+[X(91n+44) | *0.000]=X'(91n+43) |  |
|  | [X(91n+44)*0.750]+[X(91n+45) | *0.250]=X'(91n+44) |  |
| 5 pixels | [X(91n+45)*0.500]+[X(91n+46) | *0.500]=X'(91n+45) |  |
|  | [X(91n+46)*0.250]+[X(91n+47) | *0.750]=X'(91n+46) |  |
|  | [X(91n+47)*0.000]+[X(91n+48) | *1.000]=X'(91n+47) | → eliminate |
|  | [X(91n+48)*1.000]+[X(91n+49) | *0.000]=X'(91n+48) |  |
|  | [X(91n+49)*0.750]+[X(91n+50) | *0.250]=X'(91n+49) |  |
| 5 pixels | [X(91n+50)*0.500]+[X(91n+51) | *0.500]=X'(91n+50) |  |
|  | [X(91n+51)*0.250]+[X(91n+52) | *0.750]=X'(91n+51) |  |
|  | [X(91n+52)*0.000]+[X(91n+53) | *1.000]=X'(91n+52) | → eliminate |
|  | [X(91n+53)*1.000]+[X(91n+54) | *0.000]=X'(91n+53) |  |
|  | [X(91n+54)*0.750]+[X(91n+55) | *0.250]=X'(91n+54) |  |
| 5 pixels | [X(91n+55)*0.500]+[X(91n+56) | *0.500]=X'(91n+55) |  |
|  | [X(91n+56)*0.250]+[X(91n+57) | *0.750]=X'(91n+56) |  |
|  | [X(91n+57)*0.000]+[X(91n+58) | *1.000]=X'(91n+57) | → eliminate |
|  | [X(91n+58)*1.000]+[X(91n+59) | *0.000]=X'(91n+58) |  |
|  | [X(91n+59)*0.750]+[X(91n+60) | *0.250]=X'(91n+59) |  |
| 5 pixels | [X(91n+60)*0.500]+[X(91n+61) | *0.500]=X'(91n+60) |  |
|  | [X(91n+61)*0.250]+[X(91n+62) | *0.750]=X'(91n+61) |  |
|  | [X(91n+62)*0.000]+[X(91n+63) | *1.000]=X'(91n+62) | → eliminate |
|  | [X(91n+63)*1.000]+[X(91n+64) | *0.000]=X'(91n+63) |  |
| 4 pixels | [X(91n+64)*0.625]+[X(91n+65) | *0.375]=X'(91n+64) |  |
|  | [X(91n+65)*0.250]+[X(91n+66) | *0.750]=X'(91n+65) |  |
|  | [X(91n+66)*0.000]+[X(91n+67) | *1.000]=X'(91n+66) | → eliminate |
|  | [X(91n+67)*1.000]+[X(91n+68) | *0.000]=X'(91n+67) |  |
|  | [X(91n+68)*0.750]+[X(91n+69) | *0.250]=X'(91n+68) |  |
| 5 pixels | [X(91n+69)*0.500]+[X(91n+70) | *0.500]=X'(91n+69) |  |
|  | [X(91n+70)*0.250]+[X(91n+71) | *0.750]=X'(91n+70) |  |
|  | [X(91n+71)*0.000]+[X(91n+72) | *1.000]=X'(91n+71) | → eliminate |
|  | [X(91n+72)*1.000]+[X(91n+73) | *0.000]=X'(91n+72) |  |
|  | [X(91n+73)*0.750]+[X(91n+74) | *0.250]=X'(91n+73) |  |
| 5 pixels | [X(91n+74)*0.500]+[X(91n+75) | *0.500]=X'(91n+74) |  |
|  | [X(91n+75)*0.250]+[X(91n+76) | *0.750]=X'(91n+75) |  |
|  | [X(91n+76)*0.000]+[X(91n+77) | *1.000]=X'(91n+76) | → eliminate |
|  | [X(91n+77)*1.000]+[X(91n+78) | *0.000]=X'(91n+77) |  |
|  | [X(91n+78)*0.750]+[X(91n+79) | *0.250]=X'(91n+78) |  |
| 5 pixels | [X(91n+79)*0.500]+[X(91n+80) | *0.500]=X'(91n+79) |  |
|  | [X(91n+80)*0.250]+[X(91n+81) | *0.750]=X'(91n+80) |  |
|  | [X(91n+81)*0.000]+[X(91n+82) | *1.000]=X'(91n+81) | → eliminate |
|  | [X(91n+82)*1.000]+[X(91n+83) | *0.000]=X'(91n+82) |  |
|  | [X(91n+83)*0.750]+[X(91n+84) | *0.250]=X'(91n+83) |  |
| 5 pixels | [X(91n+84)*0.500]+[X(91n+85) | *0.500]=X'(91n+84) |  |
|  | [X(91n+85)*0.250]+[X(91n+86) | *0.750]=X'(91n+85) |  |
|  | [X(91n+86)*0.000]+[X(91n+87) | *1.000]=X'(91n+86) | → eliminate |
|  | [X(91n+87)*1.000]+[X(91n+88) | *0.000]=X'(91n+87) |  |
| 4 pixels | [X(91n+88)*0.625]+[X(91n+89) | *0.375]=X'(91n+88) |  |
|  | [X(91n+89)*0.250]+[X(91n+90) | *0.750]=X'(91n+89) |  |
|  | [X(91n+90)*0.000]+[X(91(n+1)+ 0) | *1.000]=X'(91n+90) | → eliminate |

ELECTRONIC ENDOSCOPE

BACKGROUND OF THE INVENTION

1. Field of the Invention

The present invention relates to an electronic endoscope including a flexible conduit, and a video-signal processor to which the flexible conduit is detachably joined.

2. Description of the Related Art

The flexible conduit of the electronic endoscope has a solid image sensor, such as a CCD (charge-coupled device) image sensor, provided at the distal end thereof, and an objective lens system associated therewith. An object to be photographed is focused, as an optical image, on a light receiving surface of the CCD image sensor by the objective lens system, and the optical image is converted into analog electric image-pixel signals by the CCD image sensor.

The flexible conduit includes an optical guide extending therethrough, and the optical guide terminates at a light-emitting end face at the distal end of the flexible conduit. On the other hand, the video-signal processor of the electronic endoscope also includes an optical guide provided therein. When the flexible conduit is joined to the video-signal processor, one end of the optical guide of the video-signal processor is connected to a proximal end of the optical guide of the flexible conduit. The video-signal processor further includes a light source, and a collective lens system associated therewith, and light rays emitted from the light source are focused on the other end face of the optical guide of the video-signal processor by the collective lens system.

Thus, a front area of the distal end of the flexible conduit is illuminated by the light rays emitted from the light-emitted end face or distal end face of the optical guide of the flexible conduit.

For reproduction of a photographed image as a color image, for example, an RGB-field-sequential-type color-imaging system is introduced in the electronic endoscope. Namely, a rotary RGB color-filter is intervened between the light source and the inner end face of the optical guide of the video-signal processor, and the RGB color filter is rotated at a given frequency of rotation, whereby an object to be photographed is sequentially illuminated by red light rays, green light rays, and blue light rays. Thus, a red optical image, a green optical image, and a blue optical image are sequentially focused on the light receiving surface of the CCD image sensor at given time intervals.

When either a red, green, or blue optical image is focused on the light receiving surface of the CCD image sensor, the optical image is converted into analog image-pixel signals by the CCD image sensor. The analog electric image-pixel signals are then read out of the CCD image sensor, in succession, by a CCD driver circuit. The read analog image-pixel signals are fed to the video-signal processor, in which the analog image-pixel signals are subjected to suitable image-processings. Then, the processed analog image-pixel signals are converted into digital image-pixel signals by an analog-to-digital (A/D) converter, and are temporarily stored in one of three frame memories provided for the digital red image-pixel signals, digital green image-pixel signals, and digital blue image-pixel signals.

The digital red, green, and blue image-pixel signals are read from the frame memories, and are outputted to a digital-to-analog converter (D/A), in which these digital image-pixel signals are converted into an analog color video-signal. The converted analog color video-signal is passed through a low-pass filter, and is amplified by an amplifier. Then, the amplified analog color video-signal is fed to a TV monitor for reproduction of the photographed optical image.

As is well known, the video-signal processor of the electronic endoscope is provided with a timing generator for outputting several series of clock pulses, having a given identical frequencies, to the A/D converter, the frame memories and so on. Namely, the conversion of the analog image-pixel signals into the digital image-pixel signals by the A/D converter, the storage of the digital image-pixel signals in the frame memories, and the outputting of the digital image-pixel signals from the frame memories to the D/A converter are carried out on the basis that the series of clock pulses have the same frequency, as the aforementioned operations.

In the electronic endoscope, as mentioned above, the flexible conduit is exchangeable for another flexible conduit. This is the reason why the flexible conduit is detachably joined to the video-signal processor. In general, flexible conduits to be joined to the video-signal processor are classified into two groups: one group is represented by, for example, a flexible conduit for a bronchoscope; and the other group is represented by, for example, a flexible conduit for a photogastroscope. The CCD image sensor incorporated in the flexible conduit for the bronchoscope is smaller than that of the flexible conduit for the photogastroscope.

Furthermore, if the NTSC (National Television System Committee) system is introduced in the electronic endoscope, analog image-pixel signals obtained from the CCD image sensor for the bronchoscope, must be converted into digital image-pixel signals by the A/D converter on the basis of a series of clock pulses having a frequency of 12.2727 MHz. Also, analog image-pixel signals obtained from the CCD image sensor for the photogastroscope, must be converted into digital image-pixel signals by the A/D converter on the basis of a series of clock pulses having a frequency of 14.3182 MHz.

On the other hand, if the PAL (Phase Alternation by Line) system is introduced in the electronic endoscope, analog image-pixel signals obtained from the CCD image sensor for the bronchoscope, must be converted into digital image-pixel signals by the A/D converter on the basis of a series of clock pulses having a frequency of 14.75 MHz. In conjunction with this, analog image-pixel signals obtained from the CCD image sensor for the photogastroscope, must be converted into digital image-pixel signals by the A/D converter on the basis of a series of clock pulses having a frequency of 17.0625 MHz.

Accordingly, in the video-signal processor of the conventional electronic endoscope, the timing generator is able to selectively output at least two kinds of clock pulses having frequencies of 12.2727 MHz (14.75 MHz) and 14.3182 MHz (17.0625 MHz).

Recently, with the spread of video cameras, video tape recorders, video-image processing computers and so on, a standardization for the processing of digital video signals has been proposed and put into practice. For example, in Rec. 601 Standardization (Recommendation ITU-R BT.601), a component-type digital color video signal, composed of a luminance signal component and two kinds of color-difference signal components, is recommended as the digital color video signal to be used and, further, this component-type digital color video signal should be processed on the basis of a series of clock pulses having a frequency of 13.5 MHz.

On the other hand, there is a demand for connecting the electronic endoscope to peripheral equipment other than a T.V. monitor, such as a printer, a video tape recorder, an image-processing computer and so on. Accordingly, it is necessary to modify the electronic endoscope in accordance with Rec. 601 Recommendation before the demand can be satisfied.

For the modification as mentioned above, it is easily conceivable for those skilled in the art to incorporate an analog color-matrix circuit and another analog-to-digital (A/D) converter in the video-signal processor of the electronic endoscope.

In particular, firstly, the analog color video-signal outputted from the D/A converter is inputted to the analog color-matrix circuit, where the analog color video signal is converted into a luminance signal and two kinds of color-difference signals. Then, the analog luminance signal and the two kinds of analog color-difference signals are inputted to the other A/D converter, in which the analog luminance signal and the two kinds of analog color-difference signals are converted into a digital luminance signal and two kinds of digital color-difference signals on the basis of clock pulses having the frequency of 13.5 MHz.

Thus, the electronic endoscope can output the digital component-type digital color video signal, composed of the digital luminance signal and the two kinds of digital color-difference signals, which can then be processed on the basis of the series of clock pulses having the frequency of 13.5 MHz.

Nevertheless, this approach is unadvisable because a quality of a reproduced color image may be deteriorated due to the fact that the analog color video signal is subjected to the analog color-matrix conversion-processing. Also, since a low-pass filter and an amplifier must be provided at both the input and output sides of the analog color-matrix circuit, respectively, an overall arrangement of the control circuit board of the video-signal processor becomes bulky and complicated.

SUMMARY OF THE INVENTION

Therefore, a main object of the present invention is to provide an electronic endoscope comprising an image sensor, for converting an optical image into analog electric image-pixel signals, and an analog-to-digital converter for converting the analog electric image-pixel signals into digital electric image-pixel signals on the basis of a series of clock pulses, wherein the converted digital electric image-pixel signals can be processed so as to be outputted externally on the basis of another series of clock pulses having a given frequency different from that of the above-mentioned series of clock pulses.

Another object of the present invention is to provide an electric endoscope of the above-mentioned type, wherein the digital electric image-pixel signals are processed in such a way that a reproduced image can be kept from deterioration caused specifically by the processing of the digital electric image-pixel signals.

Yet another object of the present invention is to provide an electric endoscope of the above-mentioned type, wherein, after the processing of the digital electric image-pixel signals, these signals are then subjected to a digital color-matrix conversion-process such that a reproduced image can be kept from deterioration caused by an analog color-matrix conversion-process.

In accordance with a first aspect of the present invention, there is provided an electronic endoscope comprising an image sensor for converting an optical image into analog electric image-pixel signals; an analog-to-digital converter for converting the analog electric image-pixel signals into digital electric image-pixel signals on the basis of a first series of clock pulses, a number of the converted digital electric image-pixel signals included in a one-horizontal-scanning-line being based upon a frequency of the first series of clock pulses; and a pixel-number converter for converting the number of the converted digital electric image-pixel signals into another number of digital image-pixel signals so as to enable the digital electric image-pixel signals to be externally outputted, while being coincident with a frequency of a second series of clock pulses, which is different from a frequency of the first series of clock pulses.

The electronic endoscope may further comprise a digital color-matrix converter, for processing the digital electric image-pixel signals, to thereby produce luminance signals and two kinds of color-difference signal components, after the conversion of the number of the digital electric image-pixel signals into the other number of digital image-pixel signals.

The frequency of the first clock pulses may be larger than the frequency of the second clock pulses. In this case, the digital electric image-pixel signals converted from the analog electric image-pixel signals by the analog-digital converter are subjected to a thinning-process executed by the pixel-number converter.

When the digital electric image-pixel signals are subjected to such a thinning-process, the pixel-number converter may include an eliminator for executing the thinning-process to eliminate a given number of image-pixel signals from the digital electric image-pixel signals to thin the digital electric image-pixel signals; and an arithmetic operator for executing an arithmetic operation to allow the eliminated image-pixel signals to remain in the thinned digital electric image-pixel signals.

The frequency of the first clock pulses may be 14.3182 MHz, and the frequency of the second clock pulses may be 13.5 MHz. In this case, the number of the digital electric image-pixel signals included in the one-horizontal-scanning-line is 910 pixels; and the 910 pixels are converted into 858 pixels by the pixel-number converter.

Optionally, the frequency of the first clock pulses is 14.75 MHz, and the frequency of the second series of clock pulses is 13.5 MHz. In this case, the number of the digital electric image-pixel signals included in the one-horizontal-scanning-line is 944 pixels, and the 944 pixels are converted into 864 pixels by the pixel-number converter.

Optionally, the frequency of the first clock pulses is 17.0625 MHz, and the frequency of the second clock pulses is 13.5 MHz. In this case, the number of the digital electric image-pixel signals included in the one-horizontal-scanning-line is 1092 pixels, and the 1092 pixels are converted into 864 pixels by the pixel-number converter.

On the other hand, the frequency of the first clock pulses may be smaller than the frequency of the second clock pulses. In this case, the digital electric image-pixel signals are subjected to an interpolating-process executed by the pixel-number converter.

When the digital electric image-pixel signal is subjected to the interpolating-process, the pixel-number converter may include an interpolator for executing the interpolating-process to interpolate a given number of image-pixel signals in the digital electric image-pixel signals; and an arithmetic operator for executing an arithmetic operation to produce the image-pixel signals to be interpolated, based on the digital electric image-pixel signals.

The frequency of the first clock pulses may be 12.2727 MHz, and the frequency of the second clock pulses may be 13.5 MHz. In this case, the number of digital electric image-pixel signals included in the one-horizontal-scanning-line is 780 pixels, and the 780 pixels are converted into 858 pixels by the pixel-number converter.

In accordance with a second aspect of the present invention, there is provided an electronic endoscope comprising an image sensor for converting an optical image into analog electric image-pixel signals; an analog-to-digital converter for converting the analog electric image-pixel signals into digital electric image-pixel signals; a clock-pulse generator for selectively outputting either a first series of clock pulses or a second series of clock pulses to the analog-to-digital converter, for the conversion of the analog electric image-pixel signals into the digital electric image-pixel signals by the analog-to-digital converter, a number of the converted digital electric image-pixel signals included in a one-horizontal-scanning-line being based upon either the frequency of the first clock pulses or the frequency of the second clock pulses; and a pixel-number converter for converting the number of the digital electric image-pixel signals, based upon either the frequency of the first clock pulses or the frequency of the second clock pulses, into another number of digital image-pixel signals so as to enable the digital electric image-pixel signals to be externally outputted, on the basis of a frequency of a third series of clock pulses.

Similar to the first aspect of the present invention, the electronic endoscope may further comprise a digital color-matrix converter for processing the digital electric image-pixel signals, to thereby produce luminance signals and two kinds of color-difference signal components, after the conversion of the number of the digital electric image-pixel signals into the other number of digital image-pixel signals.

The frequency of the first clock pulses may be larger than the frequency of the third clock pulses. In this case, the conversion of the number of the digital electric image-pixel signals, based upon the frequency of the first clock pulses, into the other number of the digital electronic image-pixel signals is carried out by a thinning-process executed by the pixel-number converter.

The frequency of the second clock pulses may be smaller than the frequency of the third clock pulses. In this case, the conversion of the number of the digital electric image-pixel signals, based upon the frequency of the second clock pulses, into the other number of the digital electronic image-pixel signals is carried out by an interpolating-process executed by the pixel-number converter.

The pixel-number converter may include an eliminator, for executing the thinning-process, so as to eliminate a given number of image-pixel signals from the digital electric image-pixel signals, in order to thin the digital electric image-pixel signals; a first arithmetic operator for executing an arithmetic operation to allow the eliminated image-pixel signals to remain in the thinned digital electric image-pixel signals; an interpolator for executing the interpolating-process to interpolate a given number of image-pixel signals in the digital electric image-pixel signals; and a second arithmetic operator for executing an arithmetic operation to produce the image-pixel signals to be interpolated, on the basis of the digital electric image-pixel signals.

Optionally, the frequency of the first clock pulses is 14.3182 MHz so that the number of the digital electric image-pixel signals based on 14.3182 MHz is 910 pixels, and the frequency of the second clock pulses is 12.2727 MHz so that the number of the digital electric image-pixel signals based on 12.2727 MHz is 780 pixels. On the other hand, the frequency of the third clock pulses may be 13.5 MHz. In this case, either the 910 pixels or the 780 pixels are converted into 858 pixels based upon the 13.5 MHz frequency of the third clock pulses.

Optionally, the frequency of the first clock pulses is larger than the frequency of the third clock pulses, so that the conversion of the number of the digital electric image-pixel signals, based upon the frequency of the first clock pulses, into the other number of the digital electric image-pixel signals, is carried out by a first thinning-process executed by the pixel-number converter; and the frequency of the second clock pulses is larger than the frequency of the third clock pulses, so that the conversion of the number of the digital electric image-pixel signals, based upon the frequency of the second clock pulses, into the other number of the digital electronic image-pixel signals is carried out by a second thinning-process executed by the pixel-number converter.

In this case, the pixel-number converter may include a first eliminator, for executing the first thinning-process, to eliminate a given number of image-pixel signals from the digital electric image-pixel signals, in order to thin the digital electric image-pixel signals; a first arithmetic operator, for executing an arithmetic operation, to allow the image-pixel signals, eliminated by the first eliminator, to remain in the thinned digital electric image-pixel signals; a second eliminator, for executing the second thinning-process, to eliminate a given number of image-pixel signals from the digital electric image-pixel signals, in order to thin the digital electric image-pixel signals; and a second arithmetic operator, for executing an arithmetic operation, to allow the image-pixel signals, eliminated by the second eliminator, to remain in the thinned digital electric image-pixel signals.

In accordance with a third aspect of the present invention, there is provided an electronic endoscope including a flexible conduit, and a video-signal processor detachably connected thereto, the endoscope comprising an image sensor provided in the flexible conduit for converting an optical image into analog electric image-pixel signals; an analog-to-digital converter for converting the analog electric image-pixel signals into digital electric image-pixel signals on the basis of a first series of clock pulses; a memory provided in the flexible conduit for storing frequency information concerning the frequency of the first clock pulses; a fetcher for fetching the frequency information from the memory when joining the flexible conduit to the video-signal processor; a clock-pulse generator for outputting the first clock pulses to the analog-to-digital converter on the basis of the frequency information fetched by the fetcher for the conversion of the analog electric image-pixel signals into the digital electric image-pixel signals by the analog-to-digital converter, a number of the converted digital electric image-pixel signals included in a one-horizontal-scanning-line being based upon a frequency of the first clock pulses; a pixel-number converter for converting the number of the digital electric image-pixel signals, based upon the frequency of the first clock pulses, into another number of digital image-pixel signals so as to enable the digital electric image-pixel signals to be externally outputted, on the basis of a series of a second series of clock pulses having a frequency different from that of the first clock pulses.

Similar to the first and second aspects of the present invention, the electronic endoscope may further comprise a digital color-matrix converter for processing the digital electric image-pixel signals, in order to produce luminance signals and two kinds of color-difference signals, after the conversion of the number of the digital electric image-pixel signals into the other number of digital image-pixel signals.

Optionally, the frequency of the first clock pulses is larger than the frequency of the second clock pulses, and the conversion of the number of the digital electric image-pixel signals into the other number of the digital electric image-pixel signals, by the pixel-number converter, is carried out by a thinning-process executed by the pixel-number converter.

In this case, the pixel-number converter may include an eliminator, for executing the thinning-process, to eliminate a given number of image-pixel signals from the digital electric image-pixel signals, in order to thin the digital electric image-pixel signals; and an arithmetic operator, for executing an arithmetic operation, to allow the eliminated image-pixel signals to remain in the thinned digital electric image-pixel signals.

Optionally, the frequency of the first clock pulses is 14.3182 MHz; the frequency of the second clock pulses is 13.5 MHz; the number of the digital electric image-pixel signals included in the one-horizontal-scanning-line is 910 pixels; and the 910 pixels are converted into 858 pixels by the pixel-number converter.

Optionally, the frequency of the first clock pulses is 14.75 MHz; the frequency of the second clock pulses is 13.5 MHz; the number of the digital electric image-pixel signals included in the one-horizontal-scanning-line is 944 pixels; and the 944 pixels are converted into 864 pixels by the pixel-number converter.

Optionally, the frequency of the first clock pulses is 17.0625 MHz; the frequency of the second clock pulses is 13.5 MHz; the number of the digital electric image-pixel signals included in the one-horizontal-scanning-line is 1092 pixels; and the 1092 pixels are converted into 864 pixels by the pixel-number converter.

On the other hand, the frequency of the first clock pulses may be smaller than the frequency of the second clock pulses, and the conversion of the number of the digital electric image-pixel signals into the other number of the digital electric image-pixel signals, by the pixel-number converter, is carried out by an interpolating-process executed by the pixel-number converter.

In this case, the pixel-number converter may include an interpolator for executing the interpolating-process to interpolate a given number of image-pixel signals in the digital electric image-pixel signals; and an arithmetic operator, for executing an arithmetic operation, to produce the image-pixel signals to be interpolated, on the basis of the digital electric image-pixel signals.

Optionally, the frequency of the first clock pulses is 12.2727 MHz; the frequency of the second clock pulses is 13.5 MHz; the number of digital electric image-pixel signals included in the one-horizontal-scanning-line is 780 pixels; and the 780 pixels are converted into 858 pixels by the pixel-number converter.

BRIEF DESCRIPTION OF THE DRAWINGS

The objects and other objects of the present invention will be better understood from the following description, with reference to the accompanying drawings in which:

FIG. 8 is an arithmetic table showing arithmetic operations executed in the digital-image processor shown in FIG. 3, for arithmetically processing the 910 pixels included in the one-horizontal-scanning-line;

FIG. 16 is an arithmetic table showing arithmetic operations executed in the digital-image processor shown in FIG. 3, for arithmetically processing the 858 pixels obtained through the process shown in FIGS. 13 and 14;

FIG. 22 is a part of an arithmetic table showing arithmetic operations executed in the digital-image processor shown in FIG. 3, for arithmetically processing the 944 pixels included in the one-horizontal-scanning-line;

FIG. 23 is the remaining part of the arithmetic table shown in FIG. 22;

FIG. 26 is a part of an arithmetic table showing arithmetic operations executed in the digital-image processor shown in FIG. 3, for arithmetically processing 1092 pixels included in one-horizontal-scanning-line;

FIG. 27 is the remaining part of the arithmetic table shown in FIG. 26;

DESCRIPTION OF THE PREFERRED EMBODIMENTS

Figure 1:
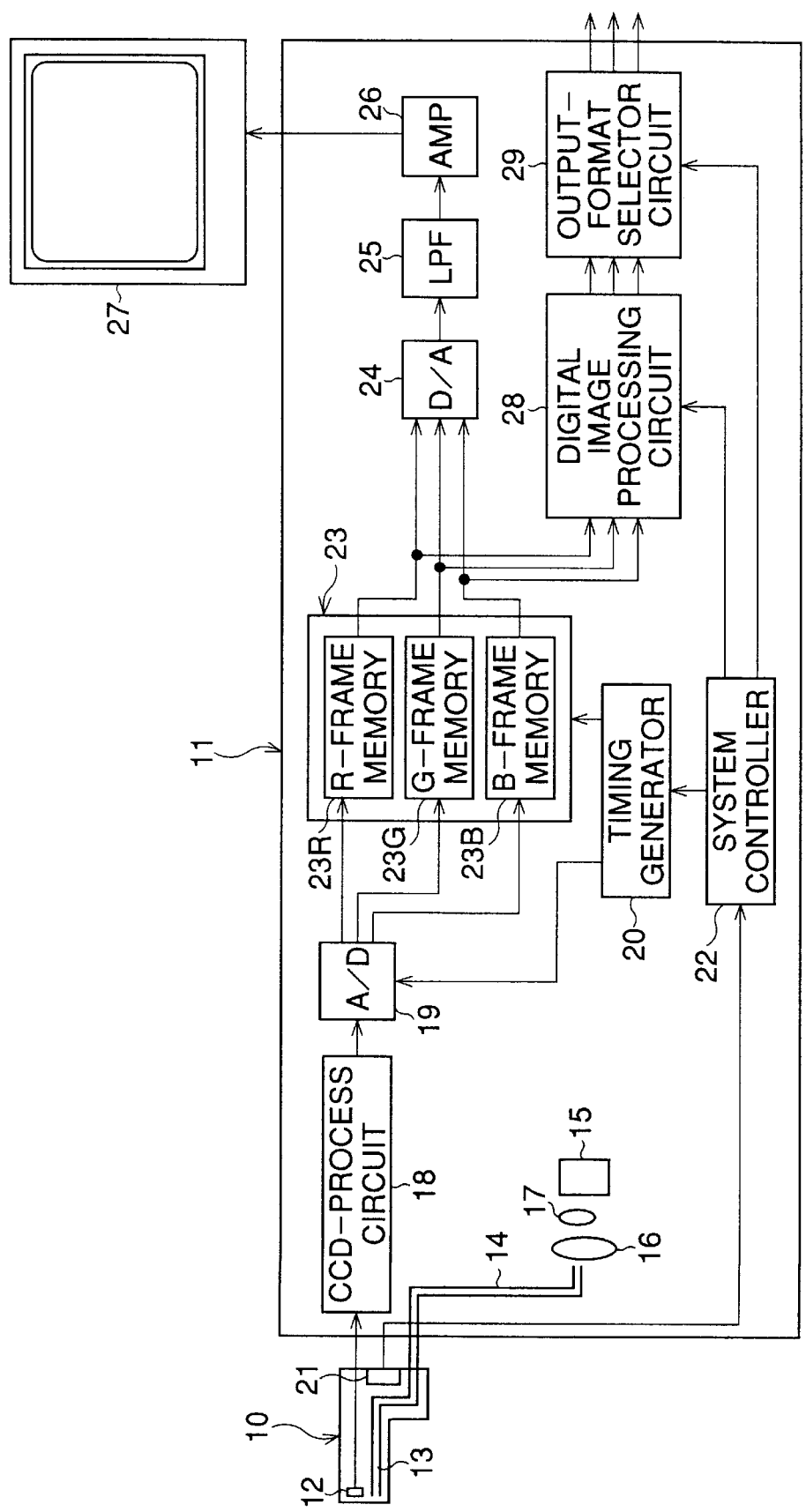
FIG. 1 is a schematic block diagram of an electronic endoscope according to the present invention.

FIG. 1 schematically shows a block diagram of an electronic endoscope according to the present invention, which includes a flexible conduit 10, and a video-signal processor 11 detachably joined thereto, and in which the NTSC system is introduced.

The flexible conduit 10 has a solid image sensor, such as a CCD (charge-coupled device) image sensor 12 provided at the distal end thereof, and an objective lens system (not shown) associated therewith. An object to be photographed is focused as an optical image on a light receiving surface of the CCD image sensor 12 by the objective lens system.

Also, the flexible conduit 10 has an optical guide 13 extended therethrough, and the optical guide 13 may be formed by a bundle of optical fibers. The optical guide 13 terminates at a light-emitting end face of the distal end of the flexible conduit 10. On the other hand, the video-signal processor 12 includes an optical guide 14 provided therein, and this optical guide 14 may be also formed by a bundle of optical fibers. When the flexible conduit 10 is joined to the video-signal processor 11, one end of the optical guide 14 of the video-signal processor 11 is connected to a proximal end of the optical guide 13 of the flexible conduit 10.

The video-signal processor 11 also includes a light source 15, which is optically connected to the other end of the optical guide 14 through the intermediary of a rotary RGB color filter 16 and a collective lens system 17, in order to thereby reproduce a photographed image as a color image. Light rays emitted from the light source are focused on the other end face of the optical guide 14 of the video-signal processor 11 through the RGB color filter 16 by the collective lens system 17.

The RGB color filter 16 is rotated at a given frequency of rotation, whereby an object to be photographed is sequentially illuminated by red light rays, green light rays, and blue light rays emitted from the light emitting surface of distal end of the optical guide 13 within the flexible conduit 10. Thus, a red optical image, a green optical image, and a blue optical image are focused on the light receiving surface of the CCD image sensor at given time intervals.

As mentioned above, in this embodiment, since the NTSC system is introduced in the electronic endoscope, the RGB color filter 16 is rotated at a rotational frequency of 30 Hz. Note, if the PAL system is introduced in the electronic endoscope, the RGB color filter 16 would be rotated at a rotational frequency of 25 Hz.

The RGB color filter 16 comprises a rotary disk member having six sectors: each alternate sector is opaque; and the remaining three sectors are formed as a red filter zone, a green filter zone, and a blue filter zone, respectively. Accordingly, during the rotation of the RGB color filter 16, the CCD image sensor 12 is blinded over a given period of time just after each of the optical red (R), green (G), and blue (B) images has been sequentially focused on the light receiving surface of the CCD image sensor 12.

Each optical image is converted into analog electric color image-pixel signals by the CCD image sensor 12, and, during the blinded period of time of the CCD image sensor 12, the analog electric image-pixel signals are successively read from the CCD image sensor 12 by a CCD driver circuit (not shown) incorporated into the flexible conduit 10.

The analog electric image-pixel signals read from the CCD image sensor 12 are fed to a CCD process circuit 18, in which the image-pixel signals are subjected to various image-processings such as white-balance processing, gamma-correction processing and so on. Then, the processed image-pixel signals are converted into digital image-pixel signals by an analog-to-digital (A/D) converter 19.

The conversion of the analog image-pixel signals into the digital image-pixel signal is carried out on the basis of a series of sampling clock pulses outputted from a timing generator 20 to the A/D converter 19, and a frequency of the clock pulses outputted from the timing generator 20 is changed in accordance with the type of CCD image sensor 12 used in the flexible conduit 10.

In particular, as discussed hereinbefore, for example, if the flexible conduit 10 is arranged for an electronic bronchoscope, the conversion of the analog image-pixel signals into digital image-pixel must be carried out on the basis of a series of sampling clock pulses having a frequency of 12.2727 MHz. Also, if the flexible conduit 10 is arranged for an electronic photogastroscope, the conversion of the analog image-signals into digital image-pixel must be carried out on the basis of a series of sampling clock pulses having a frequency of 14.3182 MHz.

Accordingly, whenever the flexible conduit 10 is joined to the video-signal processor 11, it must be determined whether the flexible conduit 10 is for a type of electronic endoscope represented by the bronchoscope or for a type of electronic endoscope represented by the photogastroscope. To this end, the flexible conduit 10 includes an EPROM (erasable programmable read-only memory) 21 in which various information data concerning the CCD image sensor 12 thereof is stored. When the flexible conduit 10 is joined to the video-signal processor 11, the EPROM 21 is connected to a system controller 22 provided therein, and the system controller 22 fetches the various information data from the EPROM 21.

The various information data includes frequency data of clock pulses to be outputted from the timing generator 20. Namely, if the frequency data is 12.2727 MHz, the system controller 22 commands the timing generator 20 to output a series of clock pulses having the frequency of 12.2727 MHz to the A/D converter 19 and, if the frequency data is 14.3182 MHz, the system controller 22 commands the timing generator 20 to output a series of clock pulses having the frequency of 14.3182 MHz to the A/D converter 19.

Note, the system controller 22 may comprise a microcomputer having a central processing unit (CPU) or processor, a read-only memory (ROM) for storing programs, constants, etc, and a random access memory (RAM) for storing temporary data.

As shown in FIG. 1, the video-signal processor 11 includes a memory device 23 having an R-frame memory 23R, a G-frame memory 23G, and B-frame memory 23B.

When the digital image-pixel signals outputted from the A/D converter 19 are derived from the optical red image, these digital image-pixel signals are temporarily stored in the R-memory 23R. When the digital image-pixel signals outputted from the A/D converter 19 are derived from the optical green image, these digital image-pixel signals are temporarily stored in the G-memory 23G. When the digital image-pixel signals outputted from the A/D converter 19 are derived from the optical blue image, these digital image-pixel signals are temporarily stored in the B-memory 23B.

The storage of the digital image-pixel signals in the frame memory (23R, 23G, 23B) is carried out on the basis of a series of clock pulses outputted from the timing generator 20, and these clock pulses has the same frequency as the sampling clock pulses outputted from the timing generator 20 to the A/D converter 19.

The digital red, green, and blue image-pixel signals are successively read from the frame memories 23R, 23G, and 23B, and are outputted to a digital-to-analog converter (D/A) 24, in which these digital image-pixel signals are converted into an analog color video-signal. The converted analog color video-signal is passed through a low-pass filter 25, and is amplified by an amplifier 26. The amplified analog color video-signal is then fed to a T.V. monitor for reproduction of the photographed optical image.

The reading of the digital image-pixel signals from the frame memory (23R, 23G, 23B) is also carried out on the basis of a series of clock pulses outputted from the timing generator 20, and these clock pulses have the same frequency as the sampling clock pulses outputted from the timing generator 20 to the A/D converter 19.

The video-signal processor 11 is constituted so as to output a digital component-type color video signal composed of a luminance signal component, and two kinds of color-difference signal components in accordance with Rec. 601 Standardization (Recommendation ITU-R BT.601). To this end, the video-signal processor 11 is provided with a digital-image processing circuit 28, and an output format selector circuit 29 associated therewith. Namely, the respective digital red, green, and blue image-pixel signals outputted from the memories 23R, 23G, and 23B are converted into the digital component-type color video signal by the digital-image processing circuit 28, and the digital component-type color video signal is outputted from the output format selector circuit 29 to suitable peripheral equipment, such as a printer, a video tape recorder, an image-processing computer and so on, on the basis of clock pulses having a frequency of 13.5 MHz, as stated in detail hereinafter.

When the digital image-pixel signals, sampled by the A/D converter 19, are treated on the basis of the clock pulses having the frequency of 14.3182 MHz, a number of image-pixel signals included in one-horizontal-scanning-line is 910. Also, when the digital image-pixel signals, sampled by the A/D converter 19, are treated on the basis of the clock pulses having a frequency of 12.2727 MHz, a number of image-pixel signals included in one-horizontal-scanning-line is 780. On the other hand, when the digital component-type color video signal is treated on the basis of the clock pulses having a frequency of 13.5 MHz, a number of image-pixel signals included in one-horizontal-scanning-line is 858.

Accordingly, before the digital image-pixel signals (910) treated on the basis of the clock pulses having the frequency of 14.3182 MHz can be treated on the basis of the clock pulses having the frequency of 13.5 MHz, the 910 pixels included in one-horizontal-scanning-line must be converted into 858 pixels. Similarly, before the digital image-pixel signals (780) treated on the basis of the clock pulses having a frequency of 12.2727 MHz can be treated on the basis of the clock pulses having a frequency of 13.5 MHz, the 780 pixels included in one-horizontal-scanning-line must be converted into 858 pixels. The conversion of the number of image-pixels is executed in the digital-image processing circuit 28.

The conversion of the 910 pixels into the 858 pixels can be carried out by thinning (eliminating) the 910 pixels by 52 pixels. On the other hand, the conversion of the 780 pixels into the 858 pixels can be carried out by interpolating (adding) 78 pixels in the 780 pixels. The thinning of the 910 pixels by the 52 pixels, and the interpolation of the 78 pixels in the 780 pixels should be contrived so as to keep a reproduced color image from the deterioration caused thereby, as stated in detail hereinafter.

Figure 2:
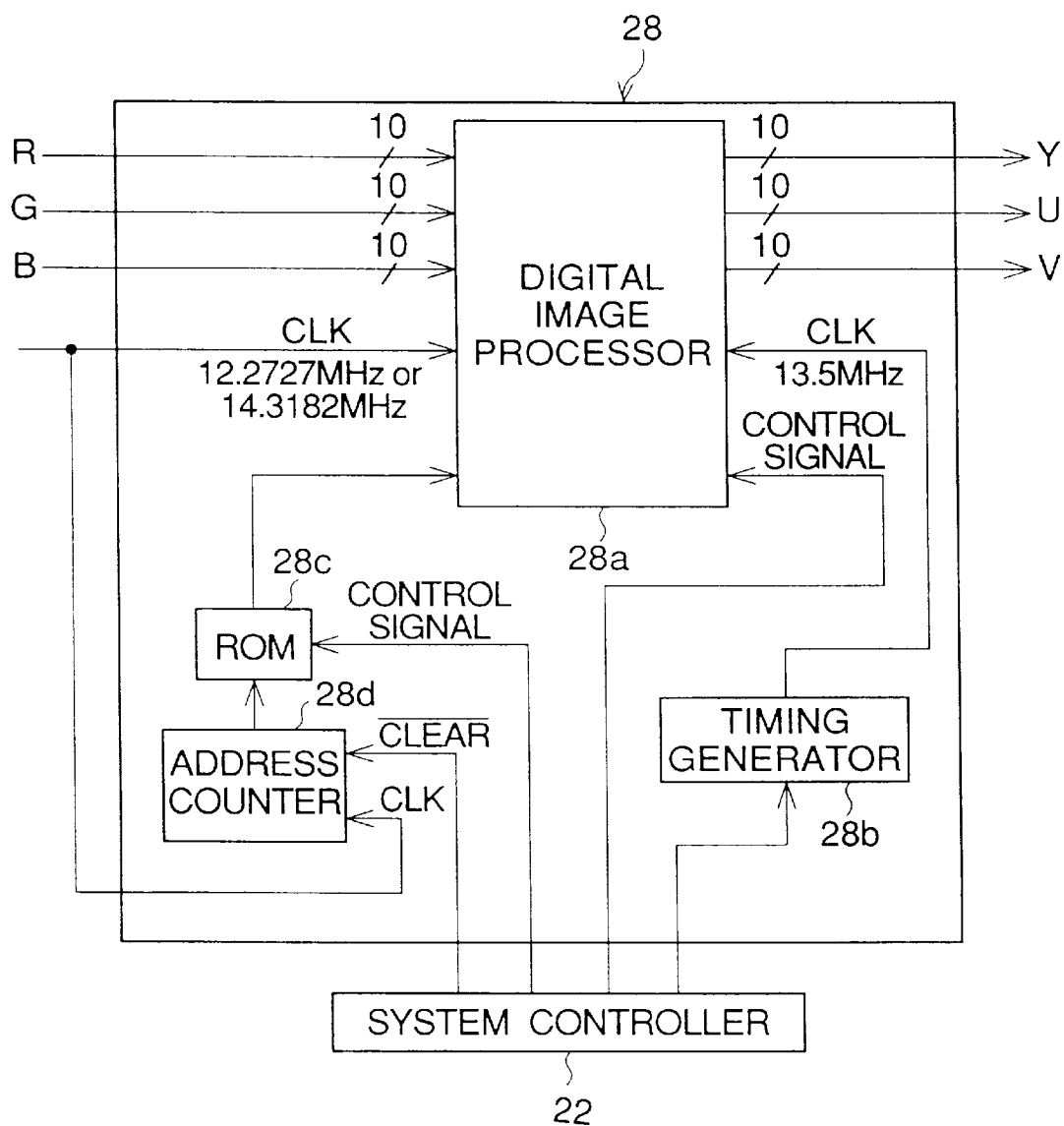
FIG. 2 is a schematic block diagram of a digital-image processing circuit included in the block diagram shown in FIG. 1.

As shown in FIG. 2, the digital-image processing circuit 28 includes a digital-image processor 28a, which may comprise a SVP (Scan-Line Video Processor) available from Texas Instruments Corporation. A one-horizontal-scanning-line of digital red image-pixel signals (R), a one-horizontal-scanning-line of digital green image signals (G), and a one-horizontal-scanning-line of blue image signals (B) read from the frame memories 23R, 23G, and 23B are inputted to the digital-image processor 28a, and are simultaneously processed therein.

The inputting of the digital image-pixel signals (R, G, and B) to the digital-image processor 28a is carried out on the basis of the clock pulses outputted from the timing generator 20 (FIG. 1). Of course, when the digital image-pixel signals (R, G, and B) are derived from an electronic endoscope represented by the photogastroscope, the clock pulses have a frequency of 14.3182 MHz, and, when the digital image-pixel signals (R, G, and B) are derived from an electronic endoscope represented by the bronchoscope, the clock pulses have a frequency of 12.2727 MHz.

As mentioned above, in the digital-image processor 28a, the digital image-pixel signals (R, G, and B) derived from an electronic endoscope represented by the photogastroscope are subjected to a thinning-process. Also, the digital image-pixel signals (R, G, and B) derived from an electronic endoscope represented by the bronchoscope are subjected to an interpolating-process.

In either case, the processed digital image-pixel signals (R, G, and B) are further subjected to a color-matrix converting-processing, to thereby produce a digital component-type color video signal composed of a luminance signal component (Y) and two kinds of color-difference signal components (U, V). The luminance signal component (Y) and the two kinds of color-difference signal components (U, V) are outputted, as the digital component-type color video signal, from the digital-image processor 28a on the basis of the clock pulses having the frequency of 13.5 MHz outputted from a second timing generator 28b provided in the digital-image processing circuit 28.

Note, as is apparent from FIG. 2, the digital-image processor 28a and the second timing generator 28b are operated under control of the system controller 22.

The SVP, available from Texas Instruments Corporation, has a maximum capacity of simultaneously processing 1,024 image-pixel signals, each of which has 42 bits. Also, the SVP has a maximum output-capacity of outputting 32-bit data. In a usual electronic endoscope, since each of the digital image-pixel signals (R, G, and B) has 10 bits, the three respective one-horizontal-scanning-lines of digital image-pixel signals can be processed all at once. Also, in the SVP, it can be programmed from a user side to indicate how the digital image-pixel signals should be processed.

Figure 3:
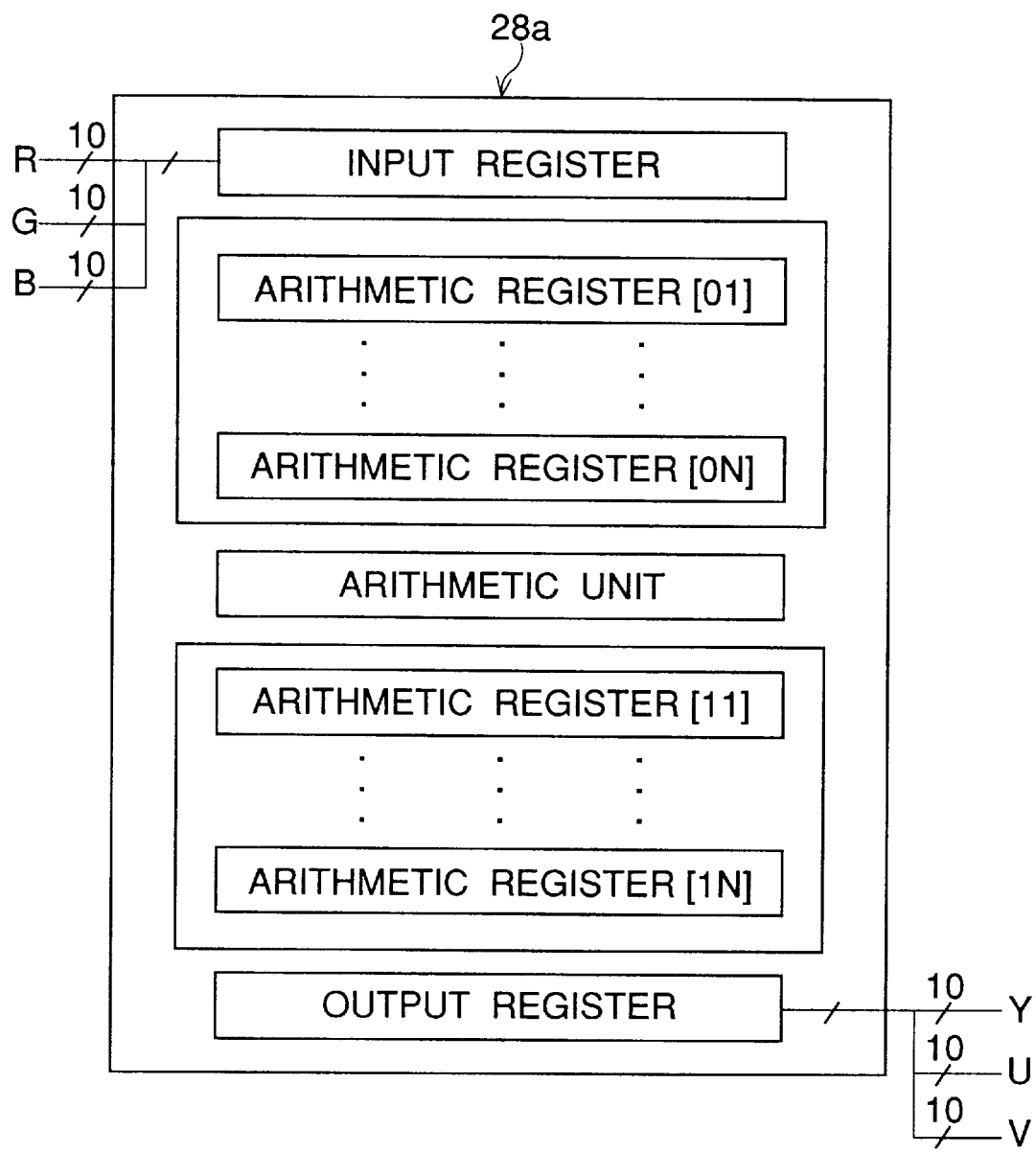
FIG. 3 is a conceptual block diagram of a digital-image processor included in the digital-image processing circuit shown in FIG. 2.

FIG. 3 schematically shows an arrangement of the digital-image processor (SVP) 28a, which includes an input register, a first group of arithmetic registers [01] to [0N], an arithmetic unit, a second group of arithmetic registers [11] to [1N], and an output register. The three respective one-horizontal-scanning-lines of digital image-pixel signals read from the memories 23R, 23G, and 23B are inputted to the input register of the digital-image processor 28a.

As shown in FIG. 2, the digital-image processing circuit 28 includes a read-only memory (ROM) 28c for storing a series of factor data and several series of flag data necessary for the above-mentioned thinning-process, and a series of factor data and several series of flag data necessary for the above mentioned interpolating-process. These data are selectively outputted from the ROM 28c, and are then inputted to the input register of the digital-image processor (SVP) 28a. The digital-image processing circuit 28 further includes an address counter 28d for controlling the outputting of data from the ROM 28c to the input register of the digital-image processor (SVP) 28a.

Figure 4:
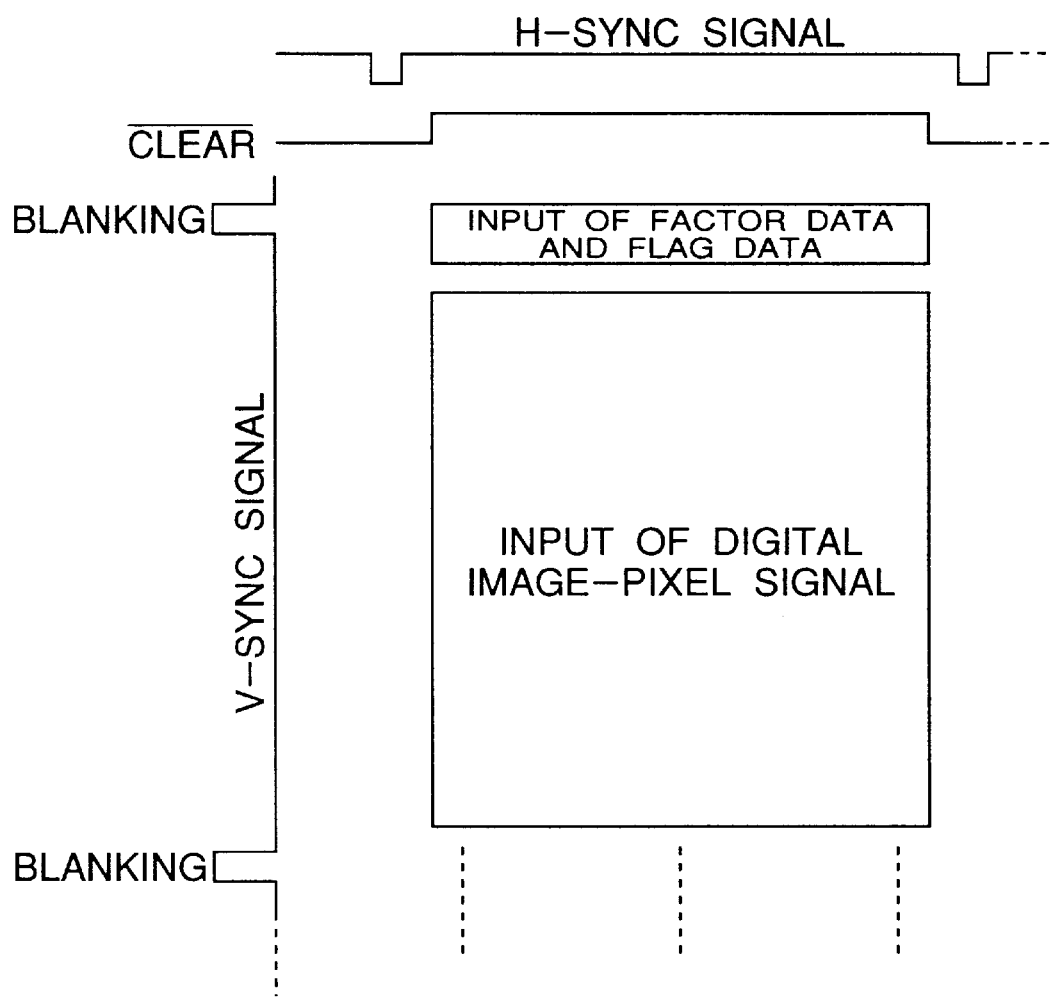
FIG. 4 is a conceptual view showing an input-timing of factor data and flag data for processing digital image-pixel signals to the digital-image processor shown in FIG. 3.

As conceptually shown in FIG. 4, the factor and flag data necessary for the thinning-process or the interpolating-process is outputted from the ROM 28c to the input register of the digital-image processor (SVP) 28a during the vertical blanking period, and the respective inputted factor and flag data are immediately transferred from the input register of the digital-image processor (SVP) 28a to any two arithmetic registers thereof. Thereafter, the inputting of the three one-horizontal lines of digital image-pixel signals (R, G, and B) to the input register of the digital-image processor 28a are successively carried out, as shown in shown in FIG. 4. The inputted digital image-pixel signals (R, G, B) are immediately transferred from the input register of the digital-image processor 28a to any one of the arithmetic registers thereof, and are temporarily stored therein.

The one-horizontal-scanning-line of digital image-pixel data (R, G, B) is subjected to arithmetic operations for the thinning-process or the interpolating-process on the basis of the factor and flag data, and the arithmetic operations are successively executed by the arithmetic unit of the digital-image processor 28 in accordance with a given program. The results of the arithmetic operations are temporarily stored in any one of the arithmetic registers of the digital-image processor 28a. When all of the arithmetic operations are completed, the final results of the arithmetic operations are transferred to the output register of the digital-image processor 28a, and are then outputted as the digital component-type color video signal (Y, U, and V) from the digital-image processor 28a on the basis of the clock pulses having the frequency of 13.5 MHz.

As shown in FIG. 2, a series of clock pulses having the frequency of 14.3182 MHz (the thinning-process) or 12.2727 MHz (the interpolating-process) is inputted from the first timing generator 20 to the address counter 28d, and a low-active clear signal ($\overline{CLEAR}$) is also inputted from the system controller 22 to the address counter 28d. The output-timing of the factor data and the flag data from the ROM 28c to the digital-image processor 28a is controlled by the low-active clear signal ($\overline{CLEAR}$) outputted from the system control circuit 22 to the address counter 28d.

Figure 5:
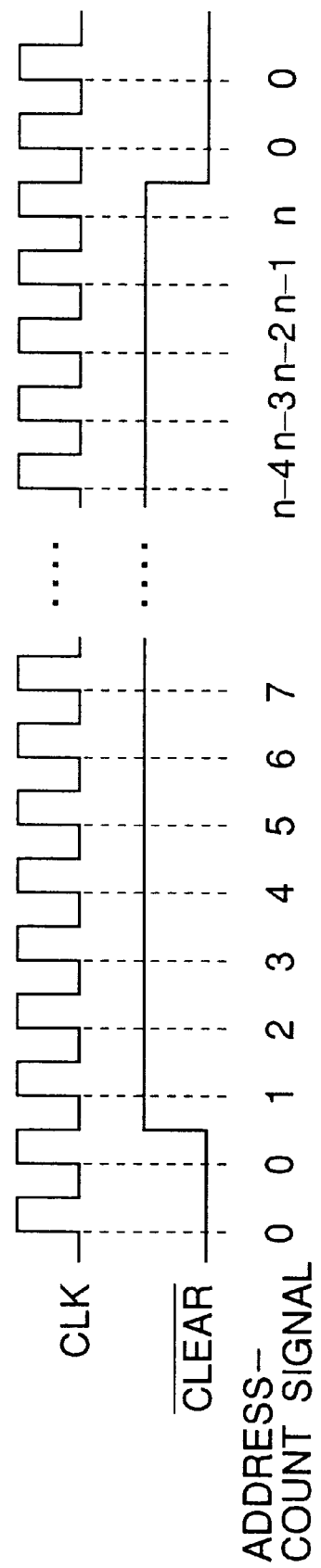
FIG. 5 is a timing-chart showing an output-timing of the factor data and flag data from a read-only memory to the digital-image processor shown in FIG. 3.

In particular, as shown in FIG. 5, when the low-active signal ($\overline{CLEAR}$) is changed from a low level to a high level, a series of address-count signals (n) is outputted from the address counter 28d to the ROM 28c in accordance with the clock pulses having the frequency of 14.3182 MHz or 12.2727 MHz. When the address-count signals (n) are inputted to the ROM 28c, for example, a series of factor data is outputted from the ROM 28c to the digital-image processor 28a in accordance with the clock pulses having the frequency of 14.3182 MHz or 12.2727 MHz, whereby the factor data is addressed to and stored in the input register of the processor 28a.

As shown in FIG. 2, a control signal is outputted from the system controller 22 to the ROM 28c, and it is determined on the basis of the control signal whether the factor and flag data necessary for the thinning-process or the factor and flag data necessary for the interpolating-process should be outputted from the ROM 28c.

In particular, as mentioned hereinbefore, when the flexible conduit 10 is joined to the video-signal processor 11, the frequency data of clock pulses is fetched from the EPROM 21 by the system controller 22. If the frequency data of clock pulses exhibits 14.3182 MHz, the system controller 22 commands the ROM 28c to output the factor and flag data for the thinning-process through the control signal. If the frequency data of clock pulses exhibits 12.2727 MHz, the system controller 22 commands the ROM 28c to output the factor and flag data for the interpolating-process through the control signal.

With reference to FIGS. 6 to 11, the thinning-process executed in the digital-image processor 28a is conceptually shown.

Figure 6:
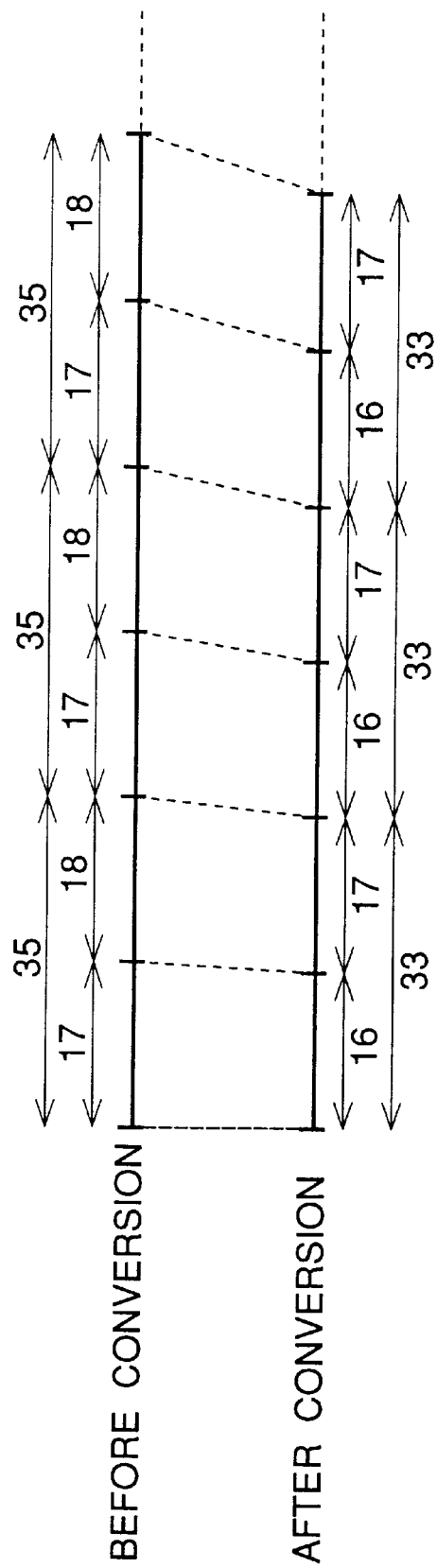
FIG. 6 is a conceptual view showing a thinning-process for converting 910 pixels included in a one-horizontal-scanning-line into 858 pixels.

As mentioned above, in the thinning-process, the 910 pixels included in a one-horizontal-scanning-line are converted into the 858 pixels by thinning the 910 pixels by the 52 pixels. To this end, the 910 pixels are divided into 26 groups of 35 pixels, and each group of 35 pixels are further divided into a first sub-group of 17 pixels and a second sub-group of 18 pixels, as shown in FIG. 6 (BEFORE CONVERSION).

Each of the first sub-groups of 17 pixels is thinned by one pixel. Each of the second sub-groups of 18 pixels is thinned by one pixel. Therefore, each of the 26 groups of 35 pixels is thinned by two pixels. Namely, each of the 26 groups of 35 pixels is converted into a group of 33 pixels, as shown in FIG. 6 (AFTER CONVERSION). Thus, the conversion of the 910 pixels into the 858 (33×26) pixels is achieved in such a manner that the 52 pixels are uniformly eliminated from the 910 pixels included in the one-horizontal-scanning-line.

To keep a reproduced color image from deteriorating due to the elimination of the 52 pixels from the 910 pixels included in the one-horizontal-scanning-line, the 52 pixels to be eliminated remain in the thinned 858.

Figure 7:
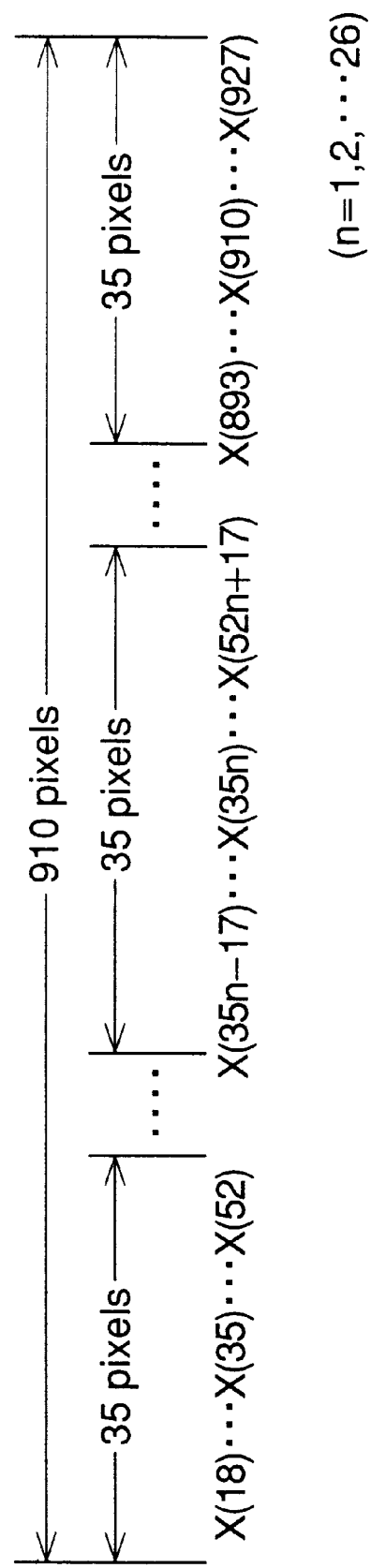
FIG. 7 is a conceptual view showing a series of terms representing every 35 consecutive pixels of the 910 pixels included in the one-horizontal-scanning-line.

In particular, when the 910 pixels included in the one-horizontal-scanning-line are divided into 26 groups of 35 pixels, the respective 35 pixels included in each of the 26 groups may be represented by 35 terms X(35n−17); . . . ; X(35n); . . . ; and X(35n+17), as shown in FIG. 7. The respective terms X(35n−17); . . . ; X(35n); . . . ; and X(35n+17) are subjected to arithmetic operations as shown in an arithmetic table of FIG. 8, to be thereby converted into 35 terms X'(35n−17); . . . ; X'(35n); . . . ; and X'(35n+17).

As is apparent from the arithmetic table of FIG. 8. each of the 17 terms X(35n−17); . . . ; and X(35n−1) included in the first sub-group is converted into the corresponding term by adding itself multiplied by a factor "kdn" to the term just above itself and multiplied by a factor "(1-kdn)", and the factor "kdn" is varied from "0/8" to "8/8". For example, the converted term X'(35n−16) is obtained by adding the term X(35n−16) multiplied by the factor "0/8" to the term X(35n−17) multiplied by the factor "8/8". Further, the converted term X'(35n−2) is obtained by adding the term X(35n−2) multiplied by the factor "7/8" to the term X(35n−3) multiplied by the factor "1/8".

The term X(35(n−1)+17) included in the uppermost formula of the arithmetic table of FIG. 8 represents the last pixel included in the group of 35 pixels adjacent to the first sub-group of 17 pixels represented by the 17 terms X(35n−17); . . . ; and X(35n−1) of the arithmetic table of FIG. 8.

On the other hand, each of the 18 terms X(35n−0); . . . ; and X(35n+17) included in the second sub-group is converted into the corresponding term by adding itself multiplied by the factor "kdn" to the term just below itself and multiplied by the factor "(1-kdn)", and the factor "kdn" is varied from "8/8" to "0/8". For example, the converted term X'(35n+1) is obtained by adding the term X(35n+1) multiplied by the factor "8/8" to the term X(35n+2) multiplied by the factor "0/8". Further, the converted term X'(35n+16) is obtained by adding the term X(35n+16) multiplied by the factor "0/8" to the term X(35n+17) multiplied by a factor "8/8".

The term X(35(n+1)−17) included in the lowermost formula of the arithmetic table of FIG. 8 represents the first pixel included in the group of 35 pixels adjacent to the second sub-group of 18 pixels represented by the 18 terms X(35n−0); . . . ; and X(35n+17) of the arithmetic table of FIG. 8.

Note, the series of factors "kdn" and "(1-kdn)" are obtained from the ROM 28c of the digital-image processing circuit 28 in the manner as mentioned above.

Figure 9:
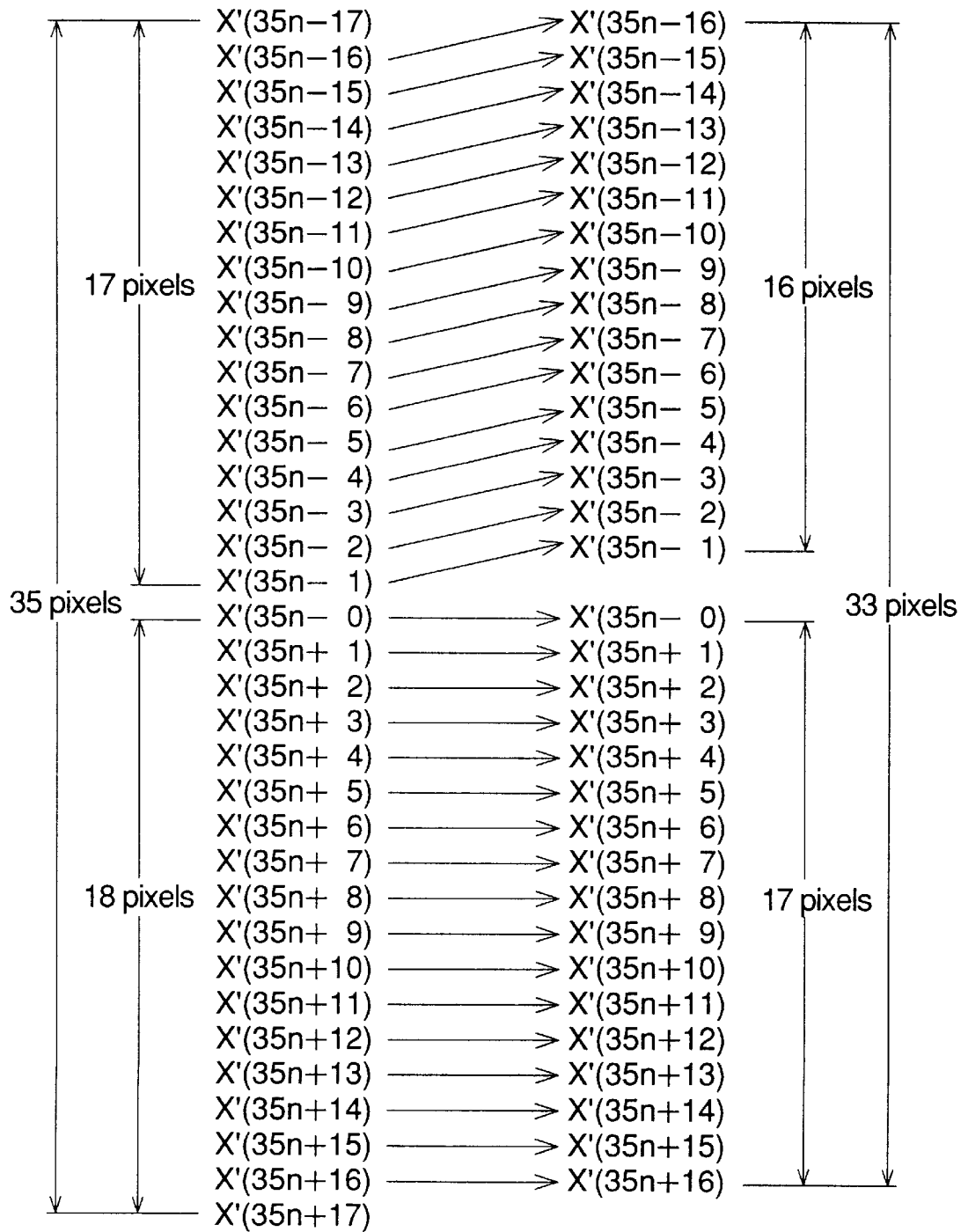
FIG. 9 is a conceptual view visually showing the thinning-process of the 910 pixels after the arithmetic operations as shown in the arithmetic table of FIG. 8.

Then, as conceptually shown in FIG. 9, the 17 terms, X'(35n−17); . . . ; and X'(35n−1), are thinned by eliminating the term X'(35n−17), and the 18 terms, X'(35n+1); . . . ; and X'(35n+17), are thinned by eliminating the term X'(35n+17). Namely, the 35 pixels included in the group concerned and represented by the 35 terms X'(35n−17); . . . ; and X'(35n+17) are converted into the 33 pixels represented by the 33 terms X'(35n−16); . . . ; and X'(35n+16). Thus, the conversion of the 910 pixels included in the one-horizontal-scanning-line into the 858 pixels is completed.

Note, as shown in FIG. 9, when the pixel represented by the term X'(35n−17) is eliminated from each of the sub-groups of 17 pixels, the pixels represented by the terms X'(35n−16); . . . ; and X'(35n−1) are shifted to produce a space corresponding to one pixel between the thinned first sub-group of 16 pixels and the thinned second sub-group of 17 pixels.

As it is apparent from the arithmetic table of FIG. 8, although the 35 pixels included in each of the groups are converted into the 33 pixels, all of the original 35 terms X(35n−17); . . . ; and X(35n+17) representing the 35 pixels included in each of the groups at least partially remain in the 33 terms X'(35n−16); . . . ; and X'(35n+16), whereby it is possible to keep a reproduced color image from the deterioration caused by the elimination of the 52 pixels from the 910 pixels.

Of course, the thinning-process is executed in the digital-image processor 28a, and the converted 858 pixels are stored in any one of the arithmetic registers of the digital-image processor 28. In this case, a space corresponding to one pixel remains between the two adjacent groups of 33 pixels, and a space corresponding to one pixel remains between the first sub-group of 16 pixels and the second sub-group of 17 pixels in each of the groups of 33 pixels. Namely, all of the sub-groups are separated from each other by the space corresponding to one pixel. Accordingly, these spaces should be displaced from the converted 858 pixels by shifting groups of pixels with respect to each other in the arithmetic register of the digital-image processor 28a.

In the SVP (digital-image processor 28a) available from Texas Instruments Corporation, the maximum positional space, which can be shifted at once time by a group of pixels, is limited to a size of four pixels. Accordingly, the displacement of the spaces from the converted 858 pixels should be reasonably and efficiently carried out, as conceptually shown in FIGS. 10 and 11.

Figure 10:
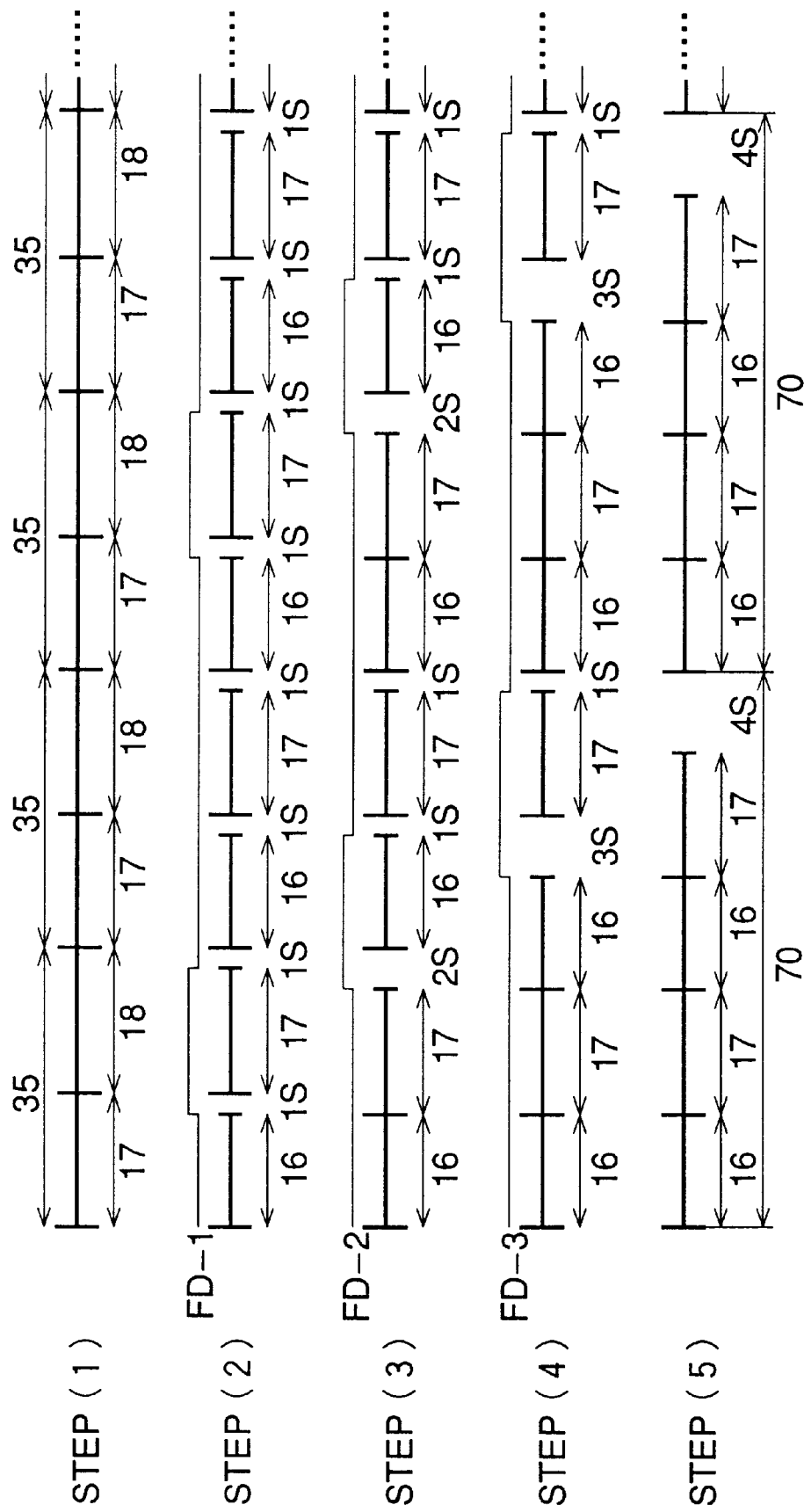
FIG. 10 is part of a conceptual flowchart showing a process for displacing spaces, produced due to the thinning-process, from the thinned pixels.

In particular, STEP (1) of FIG. 10 conceptually shows a part of the 26 groups of 35 pixels included in the one-horizontal-scanning-line and stored in any one of the arithmetic registers of the digital-image processor 28a, and each of the 26 groups of 35 pixels has the first sub-group of 17 pixels, and the second sub-group of 18 pixels.

When the 910 pixels (26×35) are converted into the 858 (26×33) pixels due to the thinning-process, the one-horizontal-scanning-line includes the 26 groups of 33 pixels each of which has the first sub-group of 16 pixels, and the second sub-group of 17 pixels. In this case, as shown in STEP (2) of FIG. 10, all of the sub-groups are separated from each other by the space "1S" corresponding to one pixel.

Initially, a first space "1S" of four consecutive spaces "1S" is displaced in accordance with FLAG DATA FD-1, and thus, the space "1S" adjacent to each of the displaced spaces becomes a twofold space "2S" due to the displacement thereof, as shown in STEP (3) of FIG. 10. Then, the space "1S" adjacent to each twofold space "2S" is displaced in accordance with FLAG DATA FD-2, and thus, the twofold space "2S" becomes a threefold space "3S", as shown in STEP (4) of FIG. 10. Further, the space "1S" adjacent to the threefold space "3S" is displaced in accordance with FLAG DATA FD-3, and thus the threefold space "3S" becomes a fourfold space "4S", as shown in STEP (5) of FIG. 10.

Figure 11:
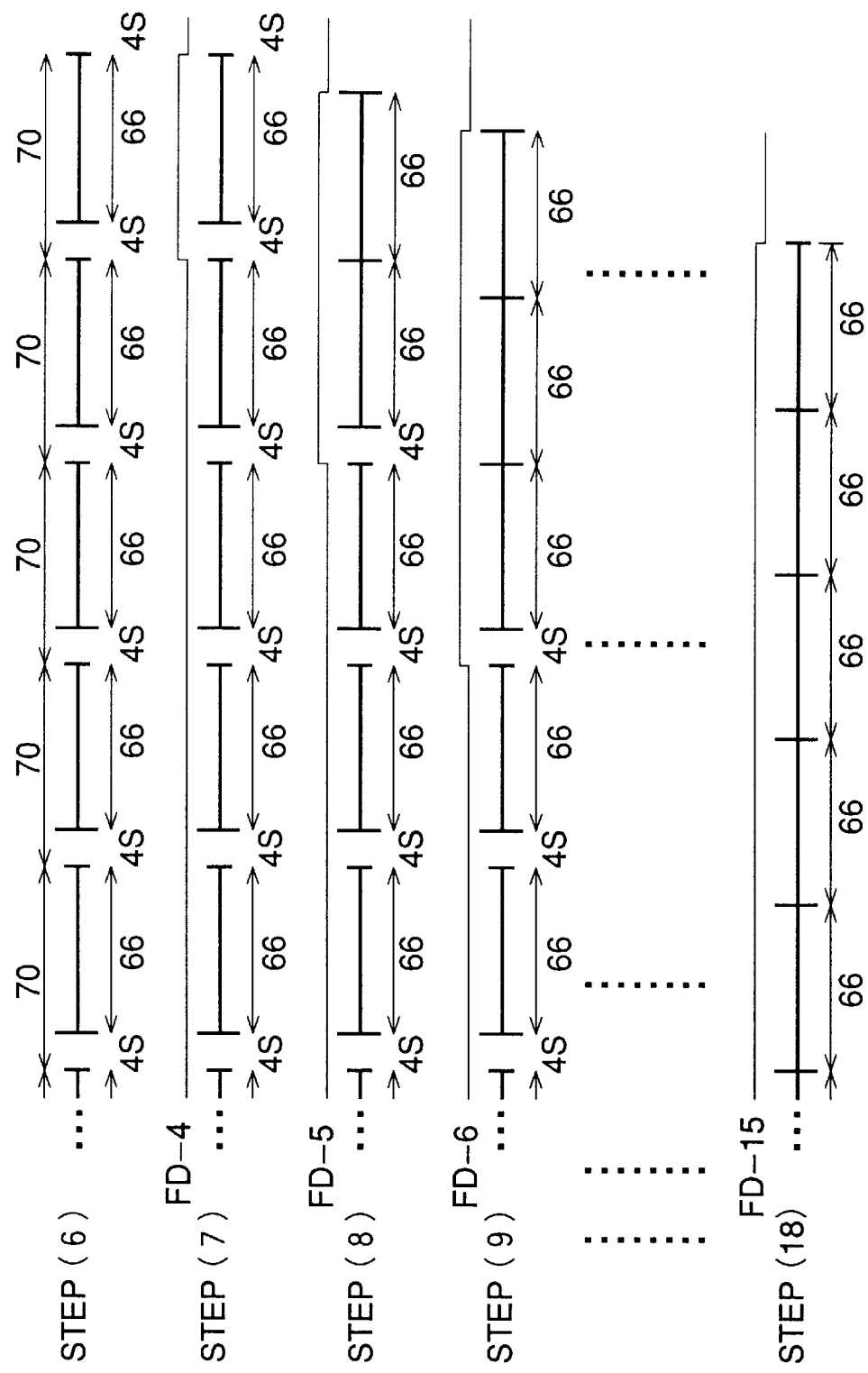
FIG. 11 is the remaining part of the conceptual flowchart shown in FIG. 10.
Figure 12:
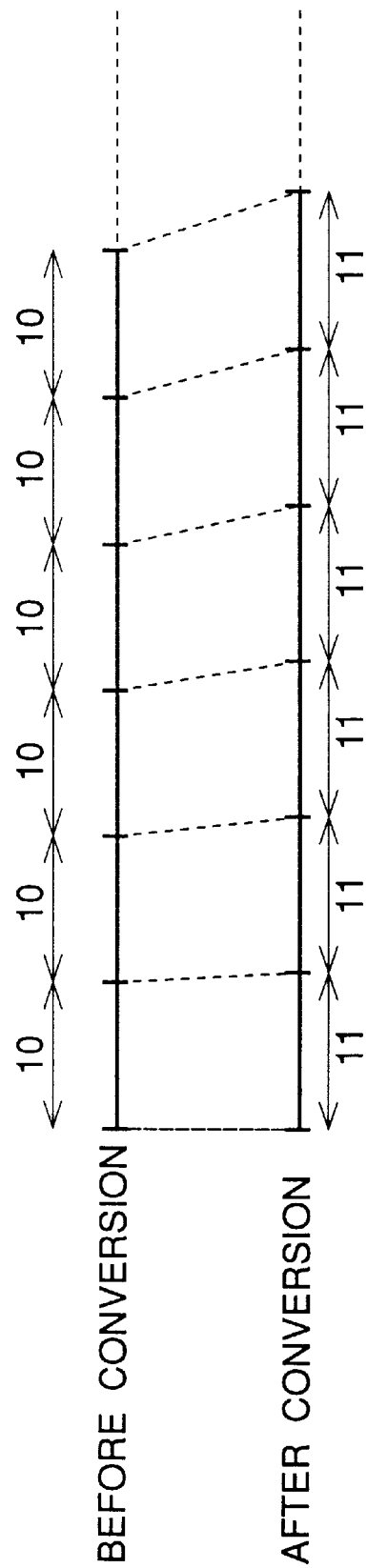
FIG. 12 is a conceptual view showing an interpolating-process for converting 780 pixels included in a one-horizontal-scanning-line into 858 pixels.

Thus, the 858 pixels exist in the arithmetic register of the digital-image processor 28a in such a manner that the 858 pixels are divided into 13 groups of 66 pixels separated from each other by the space "4S", as shown in STEP (6) of FIG. 11. Then, one of the endmost groups of 66 pixels is shifted in accordance with FLAG DATA FD-4, as shown in STEP (7) of FIG. 11, and thus the space "4S" adjacent to that endmost group of 66 pixels is displaced, as shown in STEP (8) of FIG. 11, to thereby produce a group of 132 (66×2) pixels.

Further, the group of 132 pixels is shifted in accordance with FLAG DATA FD-5, as shown in STEP (8) of FIG. 11, and thus the space "4S" adjacent to the group of 132 pixels is displaced, as shown in STEP (9) of FIG. 11, to thereby produce a group of 198 (66×3) pixels. Similarly, the fourfold spaces "4S" are successively displaced in accordance with FLAG DATA FD-6 to FD-15, and thus all of the fourfold spaces "4S" are completely displaced. Thus, the proper thinning-process for the conversion of the 910 pixels into the 858 pixels is completed.

Note, the series of FLAG DATA FD-1 to FD-15 are obtained from the ROM 28c of the digital-image processing circuit 28 in the manner as mentioned above.

With reference to FIGS. 12 to 16, the interpolating-process for interpolating the 78 pixels in the 780 pixels is conceptually shown.

As mentioned above, in the interpolating-process, the 780 pixels included in a one-horizontal-scanning-line are converted into the 858 pixels by interpolating the 78 pixels in the 780 pixels. In this case, to carry out the uniform conversion of the 780 pixels into the 858 pixels, one pixel in every ten consecutive pixels of the 780 pixels is interpolated, as conceptually shown in FIG. 12.

Figure 13:
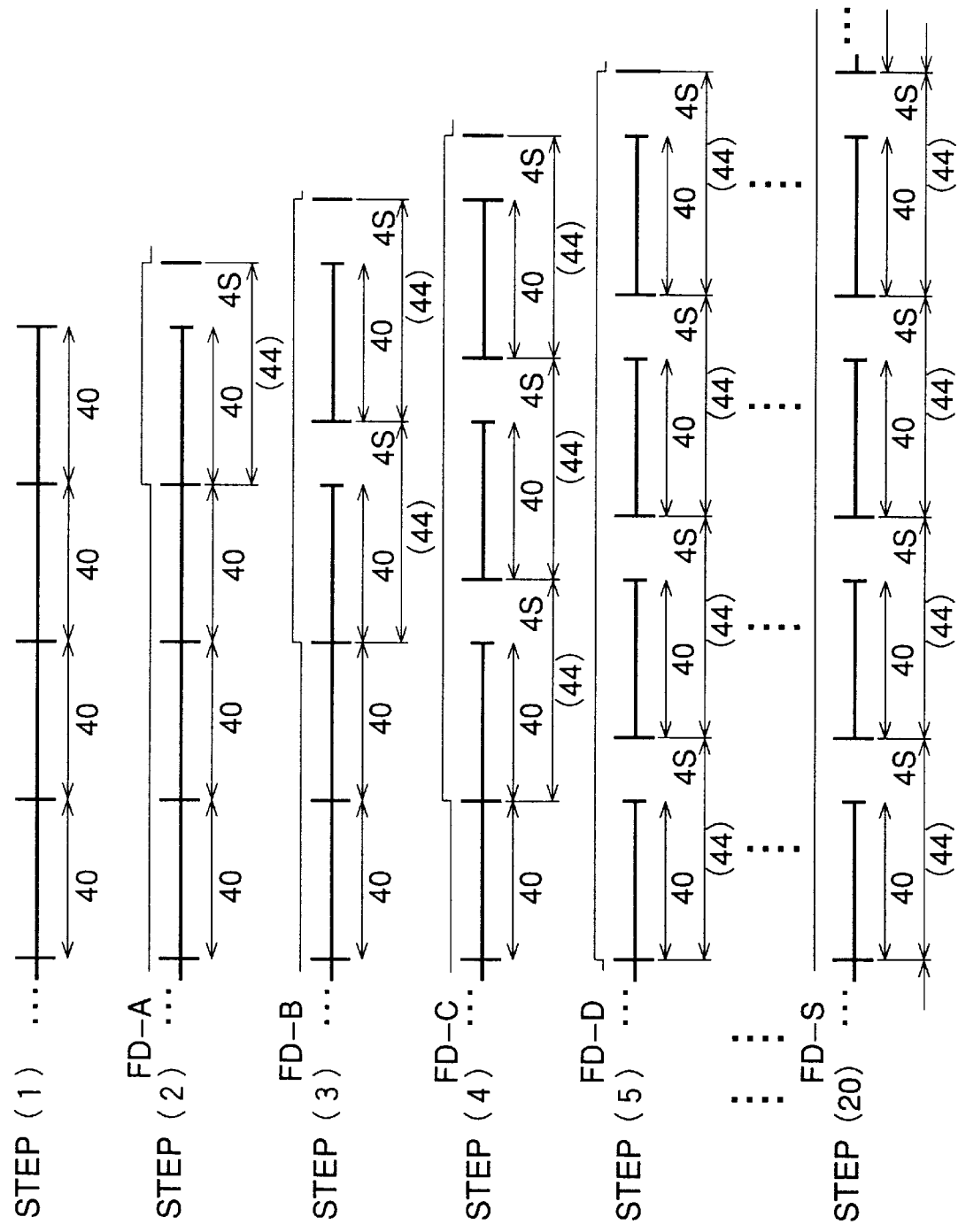
FIG. 13 is part of a conceptual flowchart showing a process for interpolating dummy-pixels in the 780 pixels for expanding the 780 pixels into 858 pixels.

To this end, initially, 20 dummy pixels are added to the 780 pixels, and then the 800 (780+20) pixels are divided into 20 groups of 40 pixels, as shown in STEP (1) of FIG. 13. Then, a space "4S" corresponding to four pixels is produced at one of the ends of the 800 pixels. Namely, four dummy pixels, by which the produced space "4S" are occupied, are added to the group of 40 pixels adjacent thereto, whereby the group of 40 pixels concerned is converted into a group of 44 pixels, as shown in STEP (2) of FIG. 13.

The group of 44 pixels is shifted in accordance with FLAG DATA FD-A so that a space "4S" corresponding to four pixels is produced between the group of 44 pixels and the group of 40 pixels adjacent thereto. Namely, four dummy pixels, by which the produced space "4S" is occupied, are added to the group of 40 pixels concerned, whereby the group of 40 pixels concerned is converted into a group of 44 pixels, as shown in STEP (3) of FIG. 13.

The two groups of 44 pixels are shifted in accordance with FLAG DATA FD-B so that a space "4S" corresponding to four pixels is produced between the most recent group of 44 pixels and the group of 40 pixels adjacent thereto. Namely, four dummy pixels, by which the produced space "4S" is occupied, are added to the group of 40 pixels concerned, whereby the group of 40 pixels concerned is converted into a group of 44 pixels, as shown in STEP (4) of FIG. 13.

Similarly, when respective spaces "4S" are successively produced in accordance with FLAG DATA FD-C to FD-S in STEP's (5) to (20), the respective remaining 17 groups of 40 pixels are converted into 17 groups of 44 pixels. Thus, the 800 pixels are converted into the 880 (20×44) pixels divided into 20 groups of 44 pixels, and each of the 20 groups of 44 pixels includes four dummy pixels by which the space 4S is occupied, as shown in STEP (21) of FIG. 14.

Figure 14:
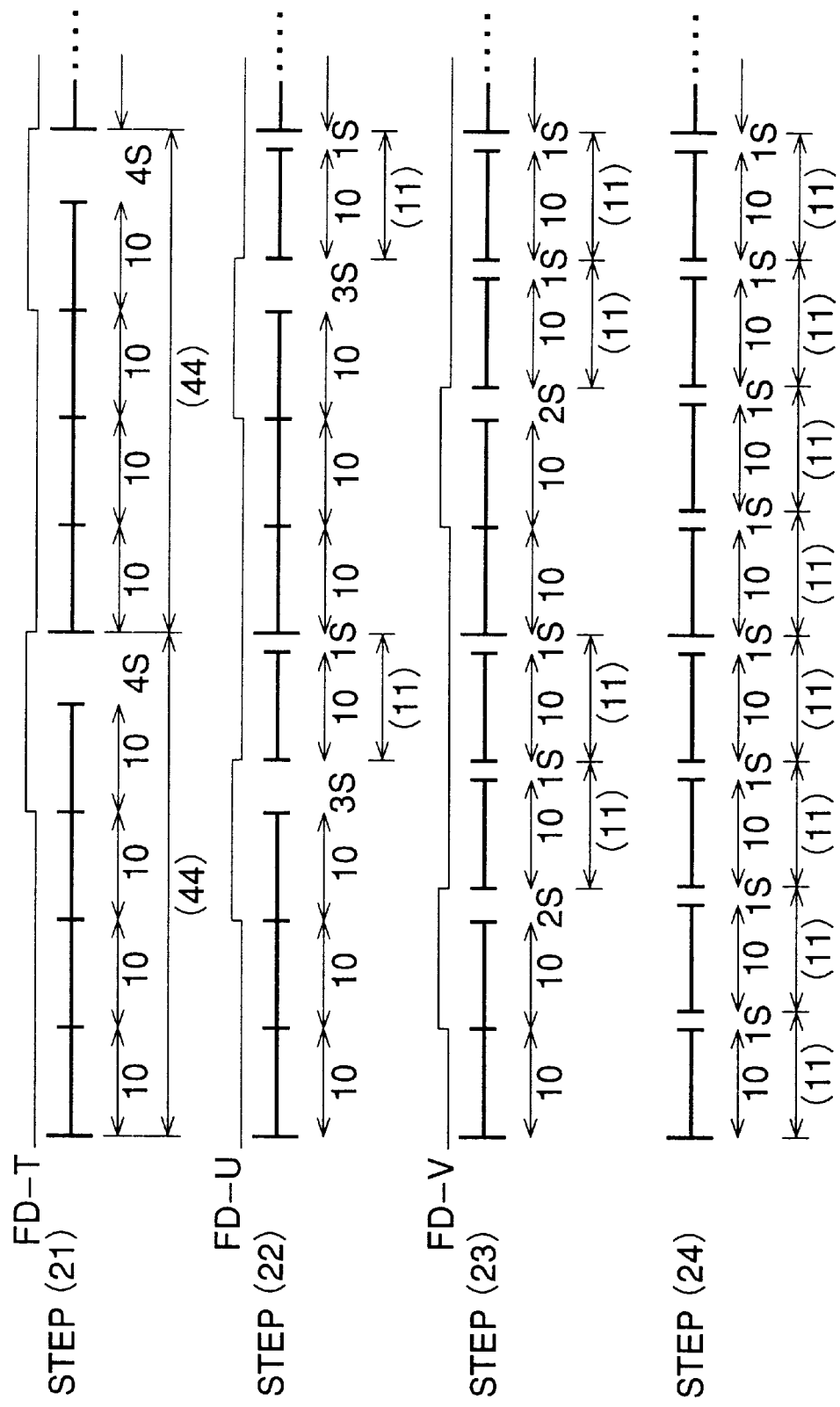
FIG. 14 is the remaining part of the conceptual flowchart shown in FIG. 13.

Then, in each of the 20 groups of 44 pixels, the 40 pixels except for the four dummy pixels are divided into four sub-groups of 10 pixels, as shown in STEP (21) of FIG. 14.

In each group of 44 pixels, the sub-group of 10 pixels adjacent to the space "4S" is shifted in accordance with FLAG DATA FD-T, to thereby produce a space "3S" corresponding to three pixels between the shifted sub-group of 10 pixels and the sub-group of 10 pixels adjacent thereto, as shown in STEP (22) of FIG. 14. Namely, the shifted sub-group of 10 pixels is given a space "1S" corresponding to one dummy pixel, whereby the shifted sub-group of 10 pixels is converted into a sub-group of 11 pixels.

Then, in each group of 44 pixels, the sub-group of 10 pixels adjacent to the space "3S" is shifted in accordance with FLAG DATA FD-U, to thereby produce a space "2S" corresponding to two pixels between the shifted sub-group of 10 pixels and the sub-group of 10 pixels adjacent thereto, as shown in STEP (23) of FIG. 14. Namely, a space "1S" corresponding to one dummy pixel is given to the shifted subgroup of 10 pixels, whereby the shifted sub-group of 10 pixels is converted into a sub-group of 11 pixels.

Further, in each group of 44 pixels, the sub-group of 10 pixels adjacent to the space "2S" is shifted in accordance with FLAG DATA FD-V, to thereby produce a space "1S" corresponding to one pixel between the shifted sub-group of 10 pixels and the sub-group of 10 pixels adjacent thereto, as shown in STEP (24) of FIG. 14. Namely, a space "1S" corresponding to one dummy pixel is given to each of the shifted sub-group of 10 pixels and the stationary sub-group of 10 pixels, whereby these respective sub-groups of 10 pixels are converted into sub-groups of 11 pixels.

Note, the series of FLAG DATA FD-A to FD-V are obtained from the ROM 28c of the digital-image processing circuit 28 in the manner as mentioned above.

Thus, the 880 pixels exit in any one of the arithmetic registers of the digital-image processor 28a in such a manner that the 880 pixels are divided into the 20 groups of 44 pixels, each of which is further divided into four sub-groups of 11.

In this case, the 20 dummy pixels, initially added to the original 780 pixels included in the one-horizontal-scanning-line, are processed and converted so as to form two of the four sub-groups of 11 pixels included in the endmost group of 44 pixels, and all of 22 pixels included in the two sub-groups concerned are dummy pixels. Accordingly, the two sub-groups concerned are eliminated from the endmost group of 44 pixels, and thus the conversion of the 780 pixels into the 858 (880−22) is achieved.

Figure 15:
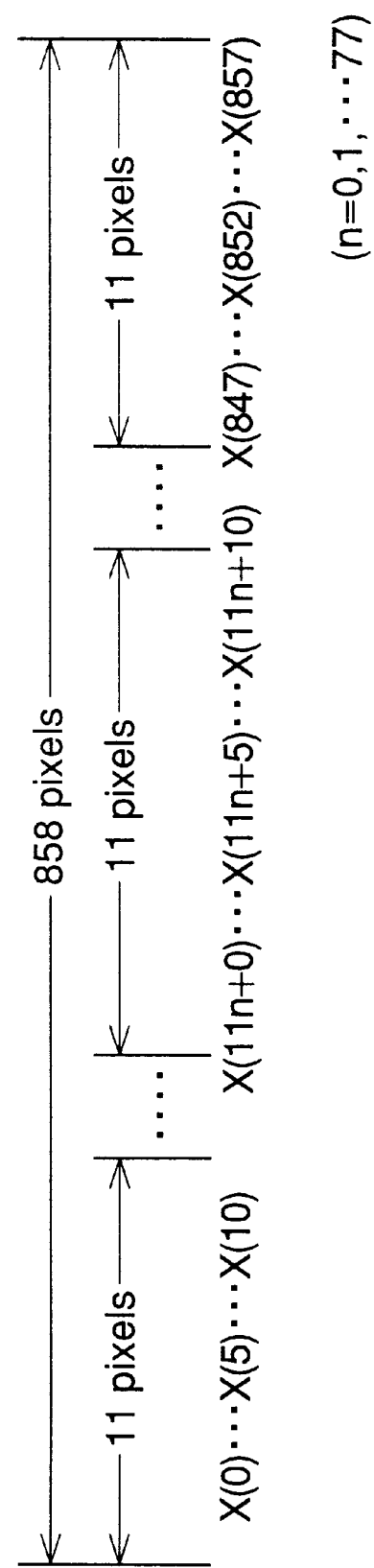
FIG. 15 is a conceptual view showing a series of terms representing every 11 consecutive pixels of the 858 pixels obtained through the process shown in FIGS. 13 and 14.

Consequently, when the converted 858 pixels are divided into 78 groups of 11 pixels, the respective 11 pixels included in each of the 78 groups may be represented by 11 terms $X(11n+0); \ldots; X(11n+5); \ldots;$ and $X(11n+10)$, as shown in FIG. 15. The respective items $X(11n+0); \ldots; X(11n+5); \ldots;$ and $X(11n+10)$ are subjected to arithmetic operations as shown in an arithmetic table of FIG. 16, to be thereby converted into 11 terms $X'(11n+0); \ldots; X'(11n+5); \ldots;$ and $X'(11n+10)$. Note, one of every 11 pixels included in each of the 78 groups is a dummy pixel which is represented by term $X(11n+0)$.

As is apparent from the arithmetic table of FIG. 16. each of the 11 terms, $X(11n+0); \ldots; X(11n+5); \ldots;$ and $X(11n+10)$, is converted into the corresponding term by adding itself, multiplied by a factor "kup", to the term just below itself, multiplied by a factor "(1-kup)", where the factor "kup" is varied from "0/8" to "8/8". For example, the converted term $Xw(11n+1)$ is obtained by adding the term $X(11n+1)$, multiplied by the factor "1/8", to the term $X(11n+2)$, multiplied by the factor "7/8". Further, the converted term $X'(11n+9)$ is obtained by adding the term $X(11n+9)$, multiplied by the factor "7/8", to the term $X(11n+10)$, multiplied by the factor "1/8".

As mentioned above, the term $X(11n+0)$ included in the uppermost formula of the arithmetic table of FIG. 16 is the dummy pixel. As is apparent from the arithmetic table of FIG. 16, no component of the dummy pixel is included in any one of the converted 11 terms $X'(11n+0); \ldots; X'(11n+5); \ldots;$ and $X'(11n+10)$, because the term $X(11n+0)$ is multiplied by the factor "0/8".

Also, the term $X(11(n-1)+0)$ included in the lowermost formula of the arithmetic table of FIG. 16 is the dummy pixel included in the group of 11 pixels following the group of 11 pixels represented by the 11 terms $X(11n+0); \ldots; X(11n+5); \ldots;$ and $X(11n+10)$ of the arithmetic table of FIG. 16. Similarly, no component of the dummy pixel represented by the term $X(11(n-1)+0)$ is included in any one of the converted 11 terms $X'l(11n+0); \ldots; X'(11n+5); \ldots;$ and $X'(11n+10)$, because of the multiplication of the term $X(11(n-1)+0)$ by the factor "10/8".

Note, the series of factors "kup" and "(1-kup)" are obtained from the ROM 28c of the digital-image processing circuit 28 in the manner as mentioned above.

In short, according to the interpolating-process as mentioned above, as one pixel to be interpolated is produced on the basis of the 10 pixels, while disregarding the dummy pixel, a reproduced color image can therefore be kept from the deterioration caused by the interpolation.

Figure 17:
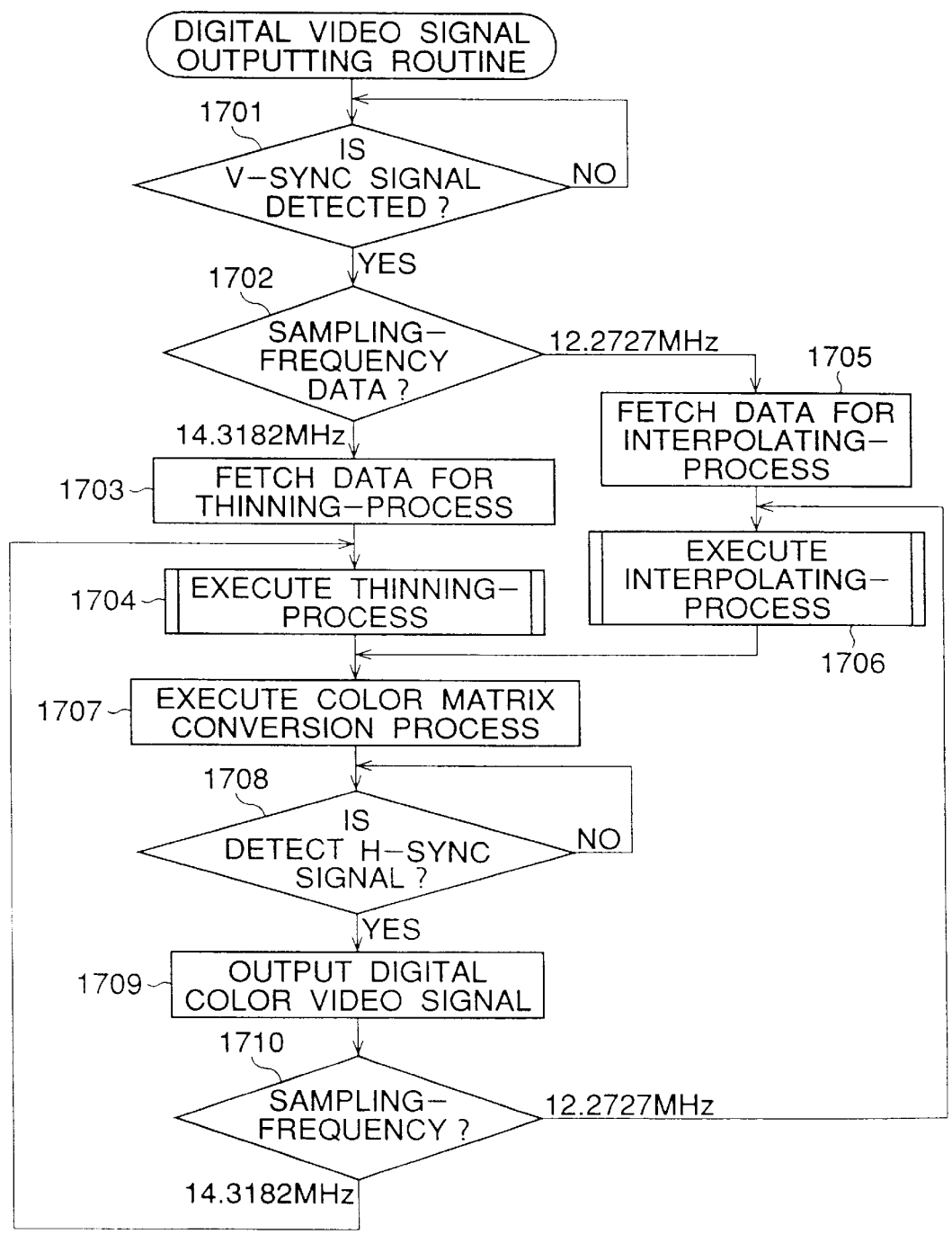
FIG. 17 is a flowchart for a digital video signal outputting routine executed in the video-signal processor of the electronic endoscope when introducing the NTSC system therein.

FIG. 17 shows a flowchart for a digital video signal outputting routine executed in the video-signal processor 11 of the electronic endoscope when introducing the NTSC system therein. This routine is executed by, for example, manually turning ON a switch (not shown) for diverting an outputted digital component-type color video signal to external peripheral equipment.

At step 1701, it is determined whether a vertical synchronizing (V-SYNC) signal is detected. When the detection of the V-SYNC signal is confirmed, control proceeds to step 1702, in which it is determined whether the frequency of sampling clock pulses is 12.2727 MHz or 14.3182 MHz on the basis of the frequency data of the clock pulses fetched from the EPROM 21 by the system controller 22.

If frequency of the sampling clock pulses is 14.3182 MHz, the control proceeds from step 1702 to step 1703, in which the system control commands the ROM 28c, through the address counter 28d, to output the series of factor data (kdn; 1-kdn) and the series of flag data (FD-1 to FD-15) to the digital-image processor 28a, during the blanking period of the vertical synchronizing signal. At step 1704, the thinning-process is executed in the digital-image processor 28a on the basis of the series of factor data (kdn; 1-kdn) and the series of flag data (FD-1 to FD-15).

Figure 18:
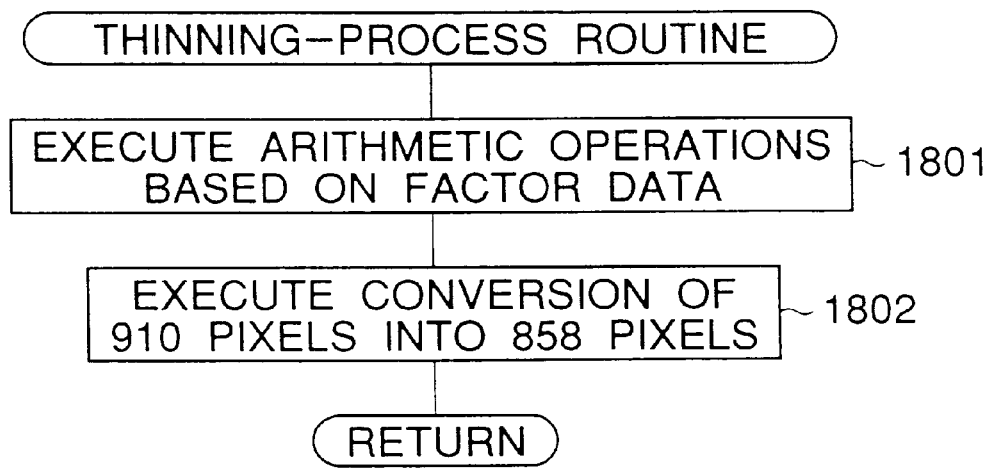
FIG. 18 is a flow chart showing a thinning-process routine forming a part of the routine shown in FIG. 17.

FIG. 18 shows a flowchart of a routine for executing the thinning-process at step 1704 of FIG. 17. Namely, at step 1801, the 910 pixels included in each of the red, green, and blue one-horizontal-scanning-lines are subjected to the arithmetic operations based on the series of factor data (kdn; 1-kdn), and then, at step 1802, the conversion of the 910 pixels into the 858 pixels is carried out on the basis of the series of flag data (FD-1 to FD-15), as explained with reference to FIGS. 6 to 11.

On the other hand, if the frequency of the sampling clock pulses is 12.2727 MHz, control proceeds from step 1702 to step 1705, in which the system control commands the ROM 28c, through the address counter 28d, to output the series of flag data (FD-A to FD-V) and the series of factor data (kup; 1-kup) to the digital-image processor 28a, during the blanking period of the vertical synchronizing signal. At step 1706, the interpolating-process is executed in the digital-image processor 28a on the basis of the series of flag data (FD-A to FD-V) and the series of factor data (kup; 1-kup).

Figure 19:
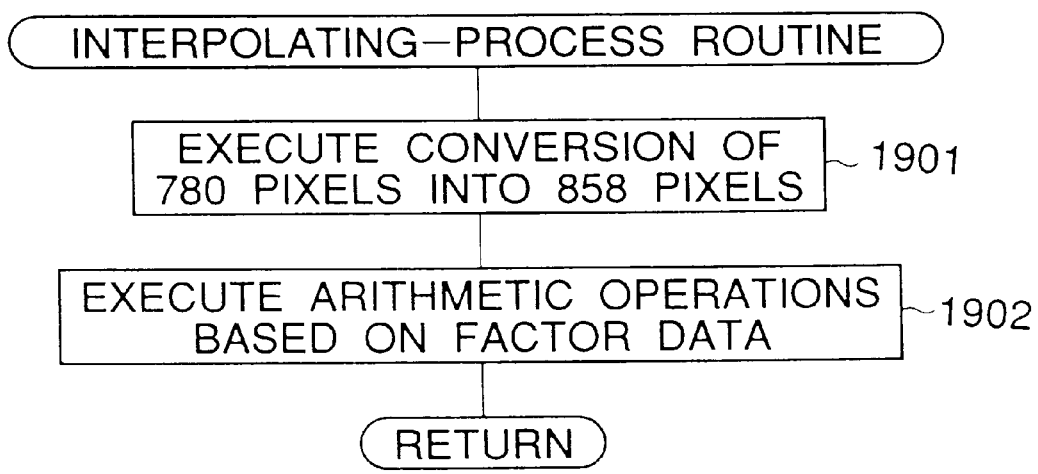
FIG. 19 is a flow chart showing an interpolating-process routine forming a part of the routine shown in FIG. 17.

FIG. 19 shows a flowchart of a routine for executing the interpolating-process at step 1706 of FIG. 17. Namely, at step 1901, the 780 pixels included in each of the red, green, and blue one-horizontal-scanning-lines are converted into the 858 pixels on the basis of the series of flag data (FD-A to FD-V), and then, at step 1902, the 858 pixels are subjected to the arithmetic operations based on the series of factor data (kup; 1-kup), as explained with reference to FIGS. 12 to 16.

When either the thinning-process or the interpolating-process is completed, the processed 858 red-pixels (R), 858 green-pixels (G), and 858 blue-pixels (B) are stored in any one of the arithmetic registers of the digital-image processor 28a.

Then, control proceeds to step 1707, in which a color-matrix converting-processing is executed in the digital-image processor 28a. Namely, the 858 red-pixels (R), 858 green-pixels (G), and 858 blue-pixels (B) are processed so as to produce a digital component-type color video signal composed of a luminance signal component (Y), and two kinds of color-difference signal components (U=B−Y;, V=R−Y). Note, in this case, 720 pixels are produced as the luminance signal component (Y) and 360 pixels produced as each of the color-difference signal components.

At step 1708, it is determined whether a horizontal synchronizing (H-SYNC) signal is detected. When the detection of the H-SYNC signal is confirmed, control proceeds to step 1709, in which the digital component-type color video signal (Y; U; and V) are outputted from the output register of the digital-image processor 28a on the basis of the clock pulses having the frequency of 13.5 MHz outputted from the second timing generator 28d (FIG. 2).

Then, control proceeds to step 1710, in which it is confirmed whether the frequency of the sampling clock pulses is 12.2727 MHz or 14.3182 MHz on the basis of the frequency data of clock pulses fetched from the EPROM 21 by the system controller 22. If the frequency of the sampling clock pulses is 14.3182 MHz, control returns to step 1704, i.e., the routine comprising steps 1704, 1707, 1708, 1709, and 1710 is repeatedly executed. If the frequency of the sampling clock pulses is 12.2727 MHz, the control returns to step 1706, i.e., the routine comprising steps 1706, 1707, 1708, 1709, and 1710 is repeatedly executed.

The digital component-type color video signal (Y; U; and V) outputted from the digital-image processor 28a is inputted to the output format selector circuit 29 (FIG. 1), and is then outputted externally therefrom in a predetermined format. For example, in this embodiment, the outputting of the digital component-type color video signal from the output format selector circuit 29 is carried out in such a manner that twice as many luminance signals (Y) are outputted as each of the two kinds of color-difference signals (U and V).

If the PAL system is introduced in the electronic endoscope as shown in FIG. 1, analog image-pixel signals obtained from the CCD image must be converted into digital image-pixel signals by the A/D converter 19 on the basis of either a series of clock pulses having the frequency of 14.75 MHz or a series of clock pulses having the frequency of 17.0625 MHz, as discussed hereinbefore. Accordingly, in this case, the timing generator 20 is constituted so as to selectively output at least two kinds of clock pulses having frequencies of 14.75 MHz and 17.0625 MHz.

When the digital image-pixel signals sampled by the A/D converter 19 is treated on the basis of the clock pulses having the frequency of 14.75 MHz, a number of image-pixel signals included in a one-horizontal-scanning-line is 944. Also, when the digital image-pixel signals sampled by the A/D converter 19 is treated on the basis of the clock pulses having the frequency of 17.0625 MHz, a number of image-pixel signals included in one-horizontal-scanning-line is 1092. On the other hand, when the digital component-type color video signal is treated on the basis of the clock pulses having the frequency of 13.5 MHz, a number of image-pixel signals included in one-horizontal-scanning-line is 864.

Accordingly, before the digital image-pixel signals (944), treated on the basis of the clock pulses having the frequency of 14.75 MHz, can be treated on the basis of the clock pulses having the frequency of 13.5 MHz, the 944 pixels included in one-horizontal-scanning-line must be converted into the 864 pixels. Similarly, before the digital image-pixel signals (1092), treated on the basis of the clock pulses having the frequency of 12.2727 MHz, can be treated on the basis of the clock pulses having the frequency of 13.5 MHz, the 1092 pixels included in one-horizontal-scanning-line must be converted into the 864 pixels.

The conversion of the 944 pixels into the 864 pixels can be carried out by thinning the 944 pixels by 80 pixels. Also, the conversion of the 1092 pixels into the 864 pixels can be carried out by thinning the 1092 pixels by 228 pixels. Similar to the case of the NTSC system, the thinning of the 944 pixels by 80 pixels, and the thinning of the 1092 pixels by 228 pixels should be contrived so as to keep a reproduced color image from the deterioration caused thereby.

With reference to FIGS. 20 to 23, the thinning-process for thinning the 944 pixels by 80 pixels is conceptually shown.

Figure 20:
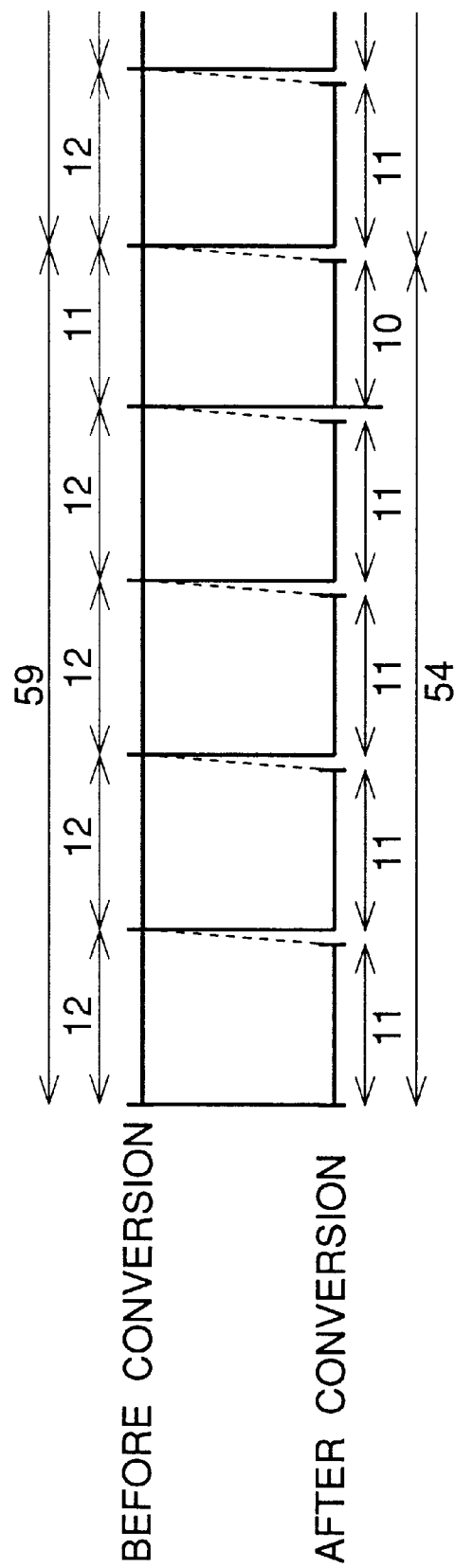
FIG. 20 is a conceptual view showing a thinning-process for converting 944 pixels included in a one-horizontal-scanning-line into 864 pixels.

First, the 944 pixels are divided into 16 groups of 59 pixels, and each group of 59 pixels is further divided into four sub-groups of 12 pixels, and sub-group of 11 pixels, as shown in FIG. 20 (BEFORE CONVERSION).

Each of the four sub-groups of 12 pixels is thinned by one pixel, and the sub-group of 11 pixels is also thinned by one pixel. Thus each of the 16 groups of 59 pixels is thinned by five pixels. Namely, each of the 16 groups of 59 pixels is converted into a group of 542 pixels, as shown in FIG. 20 (AFTER CONVERSION). Thus, the conversion of the 944 pixels into the 864 (54×16) pixels is achieved in such a manner that 80 pixels are uniformly eliminated from the 944 pixels included in the one-horizontal-scanning-line.

To keep a reproduced color image from the deterioration caused by the elimination of the 80 pixels from the 944 pixels included in one-horizontal-scanning-line, the 80 pixels to be eliminated remain in the thinned 864 pixels.

Figure 21:
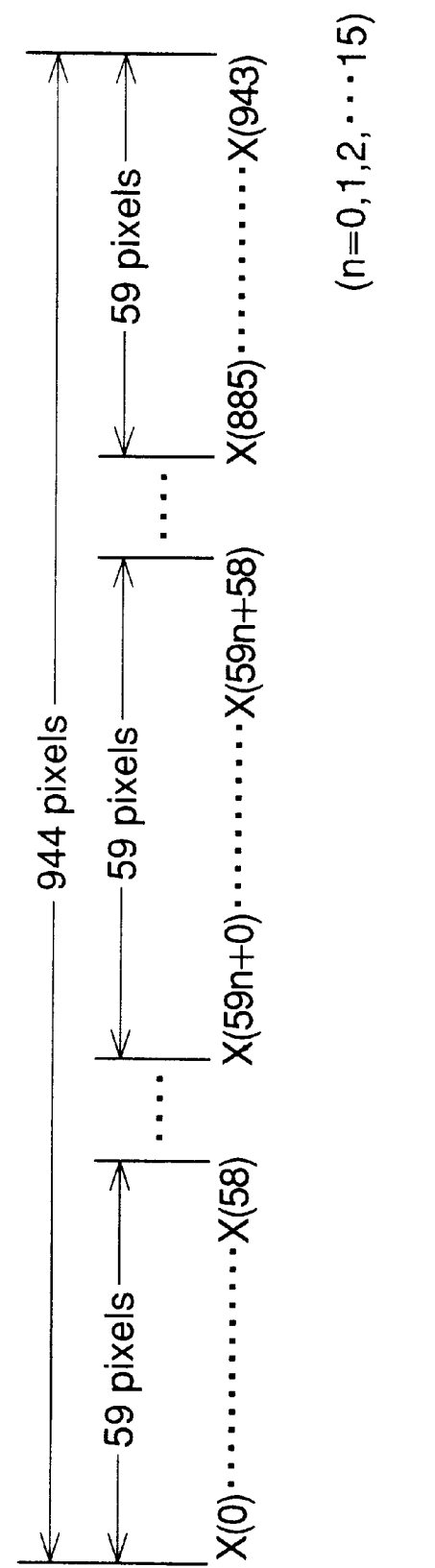
FIG. 21 is a conceptual view showing a series of terms representing every 59 consecutive pixels of the 944 pixels included in the one-horizontal-scanning-line.

In particular, when the 944 pixels included in the one-horizontal-scanning-line are divided into 26 groups of 59 pixels, the respective 59 pixels included in each of the 16 groups may be represented by 59 terms $X(59n+0); \ldots;$ and $X(59n+58)$, as shown in FIG. 21. The respective terms $X(59n+0); \ldots;$ and $X(59n+58)$ are subjected to arithmetic operations, as shown in an arithmetic table of FIGS. 22 and 23, to be thereby converted into 59 terms $X'(59n+0); \ldots;$ and $X'(59n+58)$.

As is apparent from the arithmetic table of FIGS. 22 and 23, each of the 59 terms $X(59n+0), \ldots;$ and $X(59n+58)$ is converted into the corresponding term by adding itself, multiplied by a factor "kfn", to the term just below itself, multiplied by a factor "(1-kfn)", where the factor vwkfnwl is varied from "1" to "0" in the consecutive items representing the pixels included in each of the sub-groups. For example, the converted term $X'(59n+1)$ is obtained by adding the term $X(59n+1)$, multiplied by the factor "0.875", to the term $X(59n+2)$, multiplied by the factor "0.125".

The term $X(59(n+1)+0)$ included in the lowermost formula of the arithmetic table of FIGS. 22 and 23 represents the first pixel included in the group of 59 pixels consecutively adjacent to the group of 59 pixels represented by the 16 terms $X(59n+0); \ldots;$ and $X(59n+58)$ of the arithmetic table of FIG. 22 and 23.

Note, the series of factors "kfn" and "(1-kfn)" are obtained from the ROM 28c of the digital-image processing circuit 28.

Then, the five pixels represented by the terms $X'(59n+11);$ $X'(59n+23); X'(59n+35); X'(59n+47);$ and $X'(59n+58)$ are eliminated, as indicated by the word "eliminate", in the arithmetic table of FIGS. 22 and 23, whereby each of the 16 groups of 59 pixels is converted into a group of 542 pixels, as shown in FIG. 20. Namely, the 944 pixels included in the one-horizontal-scanning-line are thinned by 80 (16×5) pixels, resulting in the conversion of the 944 pixels into the 864 (54 ×16) pixels.

As it is apparent from the arithmetic table of FIGS. 22 and 23, although the 59 pixels included in each of the groups are converted into the 542 pixels, all of the original 59 terms $X(59n+0); \ldots;$ and $X(59n+58)$ representing the 59 pixels included in each of the groups at least partially remain in the thinned 54 terms, whereby it is possible to keep a reproduced color image from the deterioration caused by the elimination of the 80 pixels from the 944 pixels.

Of course, the thinning-process is executed in the digital-image processor 28a, and the converted 864 pixels are stored in any one of the arithmetic registers of the digital-image processor 28. In this case, a space corresponding to one pixel remains between the adjacent two groups of 54 pixels, and these spaces are displaced from the converted 864 pixels in substantially the same manners as explained with reference to FIGS. 10 and 11. Note, a series of flag data for using the displacement of the spaces from the converted 864 pixels are previously read from the ROM 28c, and is stored in any one of the arithmetic register of the digital-image processor 28a.

With reference to FIGS. 24 to 27, the thinning-process for thinning 1092 (17.0625 MHz) pixels by 228 pixels is conceptually shown.

Figure 24:
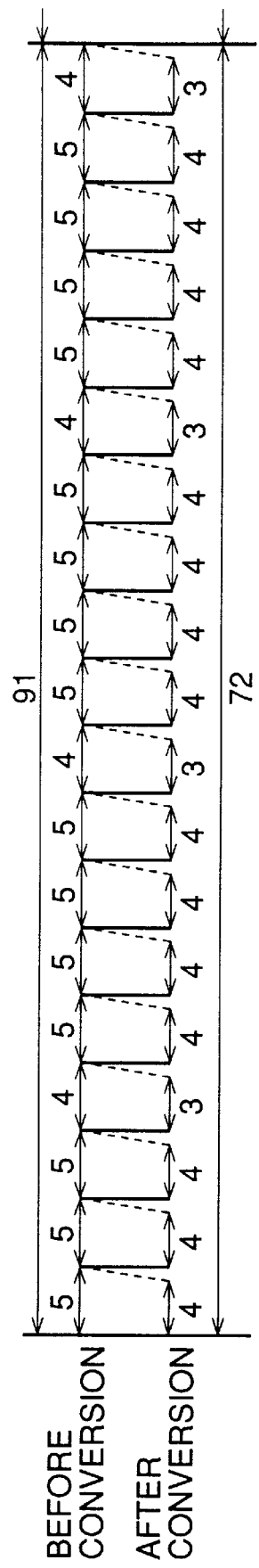
FIG. 24 is a conceptual view showing a thinning-process for converting 1092 pixels included in a one-horizontal-scanning-line into 864 pixels.
Figure 25:
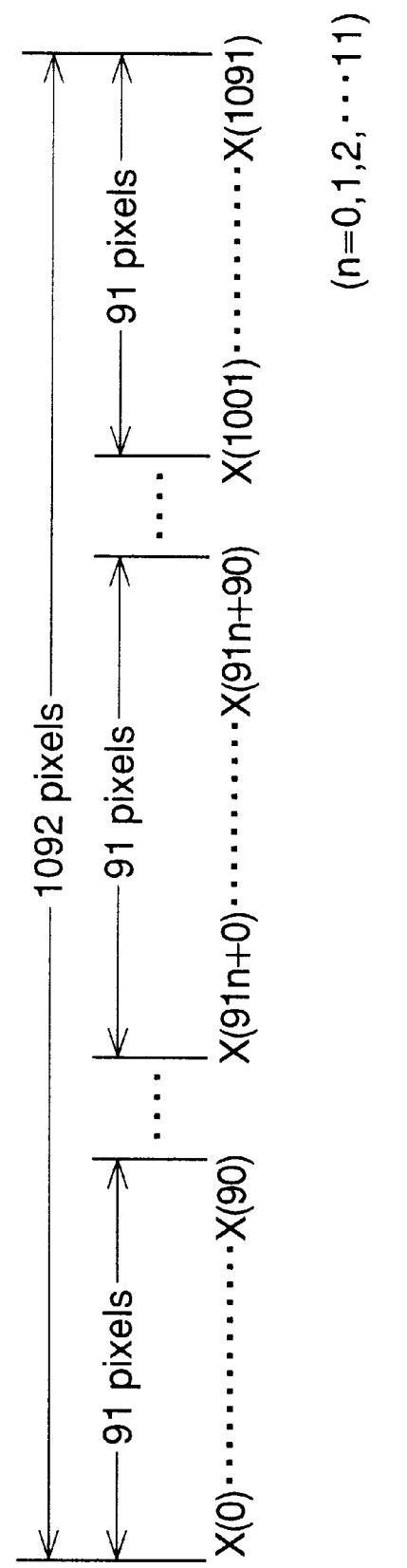
FIG. 25 is a conceptual view showing a series of terms representing every 91 consecutive pixels of the 1092 pixels included in the one-horizontal-scanning-line.

First, the 1092 pixels are divided into 12 groups of 91 pixels, and each group of 91 pixels is further divided into 15 sub-groups of five pixels, and four sub-groups of four pixels, as shown in FIG. 24 (BEFORE CONVERSION). Note, as is apparent from this drawing, it is preferable to uniformly and regularly arrange the four sub-groups of four pixels in the 15 sub-groups of five pixels.

Each of the 15 sub-groups of five pixels is thinned by one pixel, Each of the four sub-groups of four pixels is also thinned by one pixel. Thus of the 12 groups of 91 pixels is thinned by five pixels. Namely, each of the 12 groups of 91 pixels is converted into a group of 72 pixels, as shown in FIG. 24 (AFTER CONVERSION). Thus, the conversion of the 1092 pixels into the 864 (72×12) pixels is achieved in such a manner that 228 pixels are uniformly eliminated from the 1092 pixels included in the one-horizontal-scanning-line.

To keep a reproduced color image from the deterioration caused by the elimination of the 228 pixels from the 1092 pixels included in the one-horizontal-scanning-line, the 228 pixels to be eliminated remain in the thinned 864 pixels.

In particular, when the 1092 pixels included in the one-horizontal-scanning-line are divided into 12 groups of 91 pixels, the respective 91 pixels included in each of the 12 groups may be represented by 91 terms $X(91n+0);$ i and $X(91n+90)$, as shown in FIG. 21. The respective terms $X(91n+0); \ldots;$ and $X(91n+90)$ are subjected to arithmetic operations as shown in an arithmetic table of FIGS. 26 and 27, to be thereby converted into 91 terms $X'(91n+0); \ldots;$ and $X'(91n+90)$.

As is apparent from the arithmetic table of FIGS. 26 and 27, each of the 91 terms $X(91n+0); \ldots;$ and $X(91n+90)$ is converted into the corresponding term by adding itself, multiplied by a factor "kwp", to the term just below itself, multiplied by a factor "(1-kwp)", where the factor "kwp", is varied from "1" to "0" in the consecutive items representing the pixels included in each of the sub-groups. For example, the converted term $X'(91n+1)$ is obtained by adding the term $X(91n+1)$, multiplied by the factor "0.750", to the term $X(91n+2)$, multiplied by the factor "0.250".

The term $X(91(n+1)+0)$ included in the lowermost formula of the arithmetic table of FIGS. 26 and 27 represents the first pixel included in the group of 91 pixels consecutively adjacent to the group of 91 pixels represented by the 16 terms $X(91n+0); \ldots;$ and $X(91n+90)$ of the arithmetic table of FIGS. 26 and 27.

Note, the series of factors "kwp" and "(1-kwp)" are obtained from the ROM 28c of the digital-image processing it circuit 28.

Then, the 19 pixels represented by the terms indicated by the word "eliminate" in the arithmetic table of FIGS. 26 and 27 are eliminated, whereby each of the 12 groups of 91 pixels is converted into a group of 72 pixels, as shown in FIG. 24. Namely, the 1092 pixels included in the one-horizontal-scanning-line are thinned by the 228 (19×12) pixels, resulting in the conversion of the 1092 pixels into the 864 (72×12) pixels.

As is apparent from the arithmetic table of FIGS. 26 and 27, although the 91 pixels included in each of the groups are converted into the 72 pixels, all of the original 91 terms X(91n+0); . . . ; and X(91n+90) representing the 91 pixels included in each of the groups at least partially remain in the thinned 72 terms, whereby it is possible to keep a reproduced color image from the deterioration caused by the elimination of the 228 pixels from the 1092 pixels.

Of course, the thinning-process is executed in the digital-image processor 28a, and the converted 864 pixels are stored in any one of the arithmetic registers of the digital-image processor 28. In this case, a space corresponding to one pixel remains between the adjacent two groups of 72 pixels, and these spaces are displaced from the converted 864 pixels in substantially the same manner as explained with reference to FIGS. 10 and 11. Note, a series of flag data for using the displacement of the spaces from the converted 864 pixels are previously read from the ROM 28c, and is stored in any one of the arithmetic registers of the digital-image processor 28a.

Figure 28:
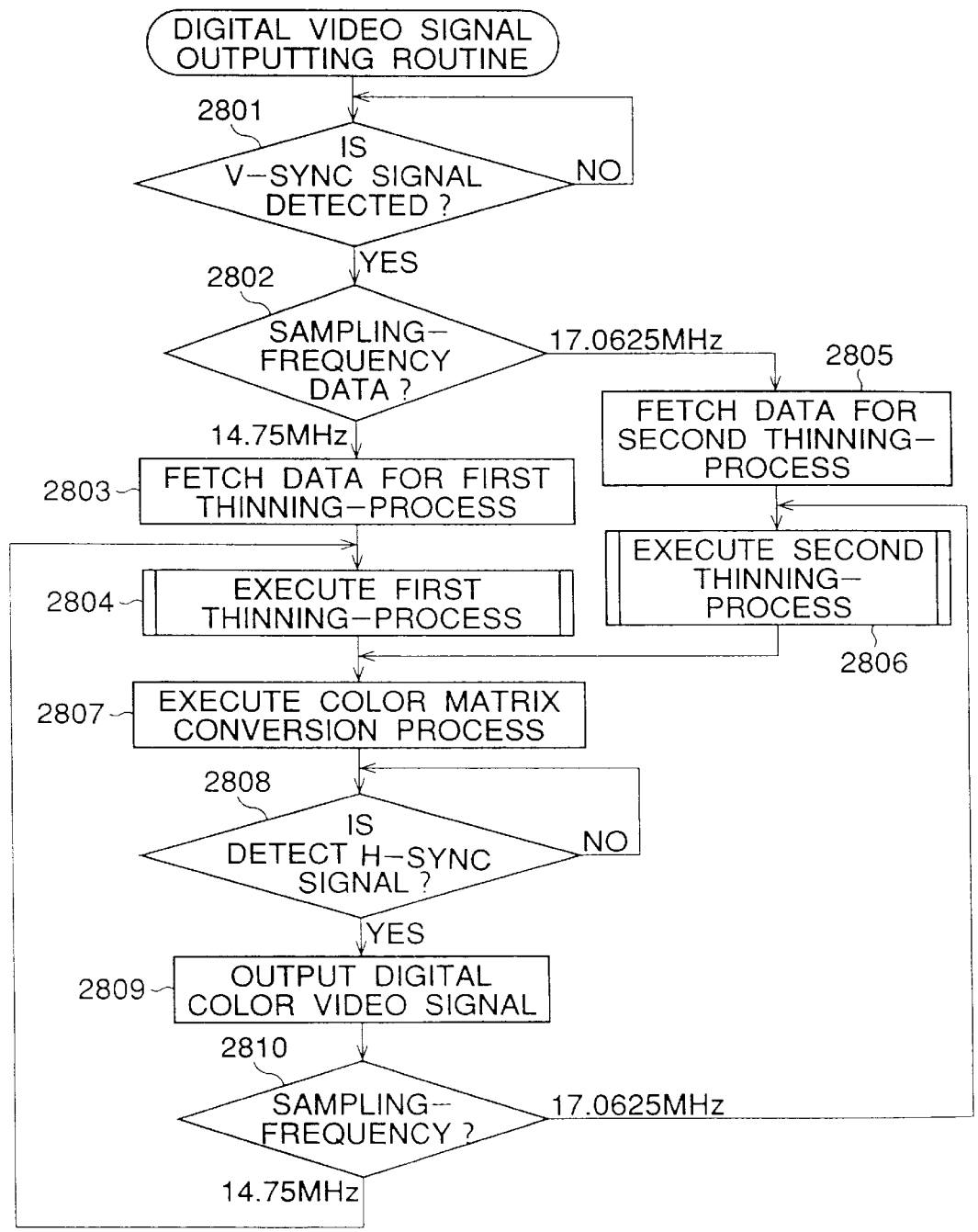
FIG. 28 is a flowchart for a digital video signal outputting routine executed in the video-signal processor of the electronic endoscope when introducing the PAL system therein.

FIG. 28 shows a flowchart for a digital video signal outputting routine executed in the video-signal processor 11 of the electronic endoscope when introducing the PAL system therein. This routine is also executed by, for example, turning on a manual switch (not shown) for switching an outputting of the digital component-type color video signal.

At step 2801, it is determined whether a vertical synchronizing (V-SYNC) signal is detected. When the detection of the V-SYNC signal is confirmed, control proceeds to step 2802, in which it is determined whether the frequency of sampling clock pulses is 14.75 MHz or 17.0625 MHz on the basis of the frequency data of clock pulses fetched from the EPROM 21 by the system controller 22.

If the frequency of the sampling clock pulses is 14.75 MHz, control proceeds from step 2802 to step 2803, in which the system control commands the ROM 28c through the address counter 28d to output the series of factor data (kfn; 1-kfn) and the series of flag data to the digital-image processor 28a, during the blanking period of the vertical synchronizing signal. At step 2804, a first thinning-process is executed in the digital-image processor 28a on the basis of the series of factor data (kfn; 1-kfn) and the series of flag data.

Figure 29:
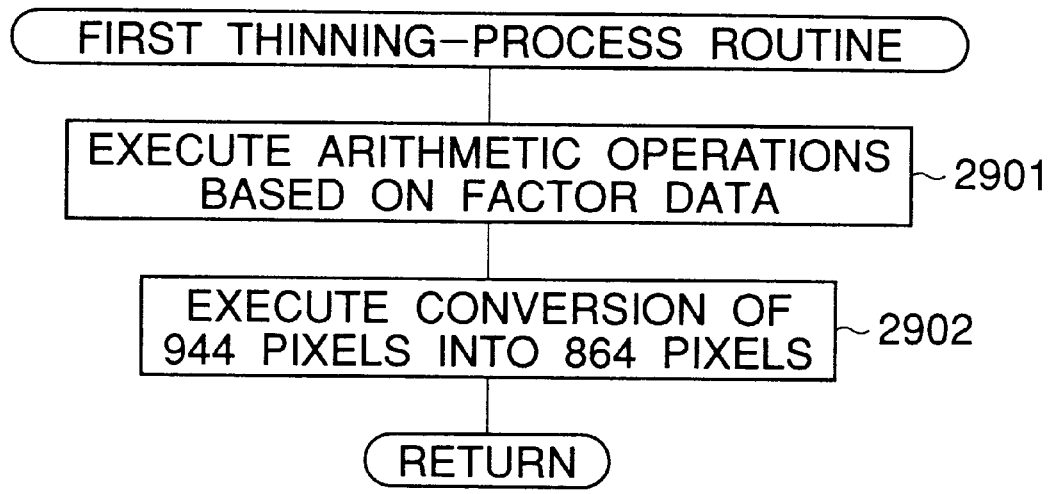
FIG. 29 is a flow chart showing a first thinning-process routine forming a part of the routine shown in FIG. 28.

FIG. 29 shows a flowchart of a routine for executing the second thinning-process at step 2804 of FIG. 28. Namely, at step 2901, the 944 pixels included in each of the red, green, and blue one-horizontal lines are subjected to the arithmetic operations based on the series of factor data (kfn; 1-kfn), and then, at step 2902, the conversion of the 944 pixels into the 864 pixels is carried out on the basis of the series of flag data, as explained with reference to FIGS. 20 to 23.

On the other hand, if the frequency of the sampling clock pulses is 17.0625 MHz, control proceeds from step 2802 to step 2805, in which the system control commands the ROM 28c through the address counter 28d to output the series of factor data (kwp; 1-kwp) and the series of flag data to the digital-image processor 28a, during the blanking period of the vertical synchronizing signal. At step 2806, a second thinning-process is executed in the digital-image processor 28a on the basis of the series of factor data (kwp; 1-kwp) and the series of flag data.

Figure 30:
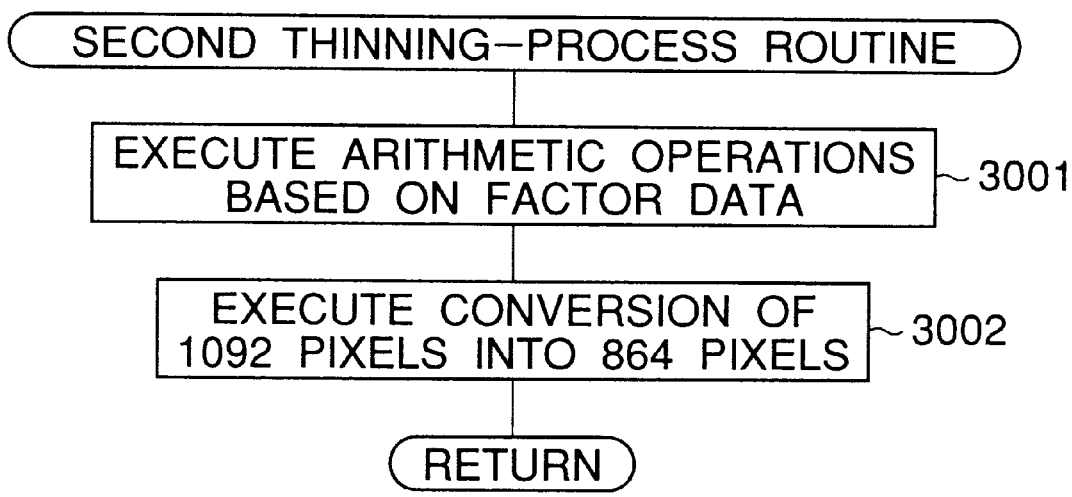
FIG. 30 is a flow chart showing an interpolating-process routine forming a part of the routine shown in FIG. 28.

FIG. 30 shows a flowchart of a routine for executing the second thinning-process at step 2804 of FIG. 28. Namely, at step 3001, the 1092 pixels included in each of the red, green, and blue one-horizontal lines are subjected to the arithmetic operations based on the series of factor data (kwp; 1-kwp), and then, at step 3002, the conversion of the 1092 pixels into the 864 pixels is carried out on the basis of the series of flag data, as explained with reference to FIGS. 24 to 27.

When either the first thinning-process or the second thinning-process is completed, the processed 864 red-pixels (R), 864 green-pixels (G), and 864 blue-pixels (B) are stored in any one of the arithmetic registers of the digital-image processor 28a.

Then, control proceeds to step 2807, in which a color-matrix converting-processing is executed in the digital-image processor 28a. Namely, the 864 red-pixels (R), 864 green-pixels (G), and 864 blue-pixels (B) are processed so as to produce a digital component-type color video signal composed of a luminance signal component (Y), and two kinds of color-difference signal components (U=B−Y;, V=R−Y). Note, in this case, 720 pixels are produced as the luminance signal component (Y), and 360 pixels produced as each of the color-difference signal components.

At step 2808, it is determined whether a horizontal synchronizing (H-SYNC) signal is detected. When the detection of the H-SYNC signal is confirmed, control proceeds to step 2809, in which the digital component-type color video signal (Y; U; and V) are outputted from the output register of the digital-image processor 28a on the basis of the clock pulses having the frequency of 13.5 MHz outputted from the second timing generator 28d (FIG. 2).

Then, control proceeds to step 2810, in which it is confirmed whether the frequency of sampling clock pulses is 14.75 MHz or 17.0625 MHz on the basis of the frequency data of clock pulses fetched from the EPROM 21 by the system controller 22. Namely, if the frequency of the sampling clock pulses is 14.75 MHz, control returns to step 2803, i.e., the routine comprising steps 2804, 2807, 2808, 2809, and 2810 is repeatedly executed. Also, if the frequency of the sampling clock pulses is 17.0625 MHz, control returns to step 2806, i.e., the routine comprising steps 2806, 2807, 2808, 2809, and 2810 is repeatedly executed.

Similar to the case as mentioned above, the digital component-type color video signal (Y; U; and V) outputted from the digital-image processor 28a is inputted to the output format selector circuit 29 (FIG. 1), and is then outputted exterally therefrom in a predetermined format.

Finally, it will be understood by those skilled in the art that the foregoing description is of preferred embodiments of the device and that various changes and modifications may be made to the present invention without departing from the spirit and scope thereof.

The present disclosure relates to subject matter contained in Japanese Patent Application No. HEI 8-153171 (filed on May 24, 1996), which is expressly incorporated herein, by reference, in its entirety.

What is claimed is:

1. An electronic endoscope, comprising:
   an image sensor that converts an optical image into analog electric image-pixel signals;
   an analog-to-digital converter that converts said analog electric image-pixel signals into digital electric image-pixel signals on a basis of a first series of clock pulses, a number of converted digital electric image-pixel signals included in one-horizontal-scanning-line being based upon a frequency of said first clock pulses;
   a pixel-number converter that converts said number of converted digital electric image-pixel signals into another number of digital image-pixel signals so as to enable said digital electric image-pixel signals to be externally outputted on a basis of a second series of clock pulses having a frequency different from that of said first clock pulses; and
   a determiner that determines whether said frequency of said first clock pulses is larger than said frequency of said second clock pulses,
   wherein said digital electric image-pixel signals converted from said analog electric image-pixel signals by said analog-digital converter are subjected to a thinning-process executed by said pixel-number converter when it is determined by said determiner that said frequency of said first clock pulses is larger than said frequency of said second clock pulses, and said digital electric image-pixel signals converted from said analog electric image-pixel signals by said analog-digital converter are subjected to a interpolating-process executed by said pixel-number converter when it is determined by said determiner that said frequency of said first clock pulses is smaller than said frequency of said second clock pulses.

2. An electronic endoscope as set forth in claim 1, further comprising a digital color-matrix converter that processes said digital electric image-pixel signals to thereby produce luminance signals and two kinds of color-difference signals, after conversion of said number of digital electric image-pixel signals into said another number of digital image-pixel signals.

3. An electric endoscope as set forth in claim 1, wherein said pixel-number converter comprises an eliminator that executes said thinning-process, to eliminate a predetermined number of image-pixel signals from said digital electric image-pixel signals, to thin said digital electric image-pixel signals; an arithmetic operator that executes an arithmetic operation to allow said eliminated image-pixel signals to remain in said thinned digital electric image-pixel signals; an interpolator that executes said interpolating-process, to interpolate a given number of image-pixel signals in said digital image-pixel signals, and an arithmetic operator that executes an arithmetic operation to produce said image-pixel signals to be interpolated, on said basis of said digital electric image-pixel signals.

4. An electronic endoscope as set forth in claim 3, said frequency of said first clock pulses is 14.3182 MHz, said frequency of said second clock pulses is 13.5 MHz, said number of digital electric image-pixel signals included in said one-horizontal-scanning-line is 910 pixels, and said 910 pixels are converted into 858 pixels by said execution of said thinning-process with said pixel-number converter.

5. An electronic endoscope as set forth in claim 3, wherein said frequency of said first clock pulses is 14.75 MHz, said frequency of said second series of clock pulses is 13.5 MHz, said number of digital electric image-pixel signals included in said one-horizontal-scanning-line is 944 pixels, and said 944 pixels are converted into 864 pixels by said execution of said thinning-process with said pixel-number converter.

6. An electronic endoscope as set forth in claim 3, wherein said frequency of said first clock pulses is 17.0625 MHz, said frequency of said second clock pulses is 13.5 MHz, said number of digital electric image-pixel signals included in said one-horizontal-scanning-line is 1092 pixels, and said 1092 pixels are converted into 864 pixels by said execution of said thinning-process with said pixel-number converter.

7. An electronic endoscope as set forth in claim 3, wherein, said frequency of said first clock pulses is 12.2727 MHz, said frequency of said second clock pulses is 13.5 MHz, said number of digital electric image-pixel signals included in said one-horizontal-scanning-line is 780 pixels, and said 780 pixels are converted into 858 pixels by said execution of said interpolating-process with said pixel-number converter.

8. An electronic endoscope, comprising:
   an image sensor that converts an optical image into analog electric image-pixel signals;
   an analog-to-digital converter that converts said analog electric image-pixel signals into digital electric image-pixel signals;
   a clock-pulse generator that selectively outputs one of a first series of clock pulses and a second series of clock pulses to said analog-to-digital converter for conversion of said analog electric image-pixel signals into digital electric image-pixel signals by said analog-to-digital converter, a number of said converted digital electric image-pixel signals included in one-horizontal-scanning-line being based upon one of a frequency of said first clock pulses and a frequency of said second clock pulses;
   a pixel-number converter that converts said number of digital electric image-pixel signals, based upon one of said frequency of said first clock pulses and said frequency of said second clock pulses, into another number of digital image-pixel signals so as to enable said digital electric image-pixel signals to be externally outputted on a basis of a third series of clock pulses having a frequency larger than said frequency of said first clock pulses but smaller than said frequency of said second clock pulses; and
   a determiner that determines whether either said first clock pulses or said second clock pulses should be outputted from said clock-pulse generator,
   wherein said digital electric image-pixel signals converted from said analog electric image-pixel signals by said analog-digital converter are subjected to a thinning-process executed by said pixel-number converter when it is determined by said determiner that said first clock pulses should be outputted from said clock-pulse generator, and said digital electric image-pixel signals converted from said analog electric image-pixel signals by said analog-digital converter are subjected to a interpolating-process executed by said pixel-number converter when it is determined by said determiner that said second clock pulses should be outputted from said clock-pulse generator.

9. An electronic endoscope as set forth in claim 8, further comprising a digital color-matrix converter that processes said digital electric image-pixel signals to produce luminance signals and two kinds of color-difference signals, after conversion of said number of digital electric image-pixel signals into said another number of digital image-pixel signals.

10. An electric endoscope as set forth in claim 8, wherein said pixel-number converter comprises an eliminator that executes said thinning-process, to eliminate a given number of image-pixel signals from said digital electric image-pixel signals to thin said digital electric image-pixel signals, a first arithmetic operator that executes an arithmetic operation to allow said eliminated image-pixel signals to remain in said thinned digital electric image-pixel signals, an interpolator that executes said interpolating-process, to interpolate a predetermined number of image-pixel signals in said digital electric image-pixel signals, and a second arithmetic operator that executes an arithmetic operation to produce said image-pixel signals to be interpolated on a basis of said digital electric image-pixel signals.

11. An electronic endoscope as set forth in claim 1, wherein said frequency of said first clock pulses is 14.3182 MHz so that said number of digital electric image-pixel signals based on said 14.3182 MHz is 910 pixels, said frequency of said second clock pulses is 12.2727 MHz so that said number of digital electric image-pixel signals based on said 12.272 MHz is 780 pixels, and said frequency of said third clock pulses is 13.5 MHz so that one of said 910 pixels and said 780 pixels are converted into 858 pixels based upon said frequency of 13.5 MHz of said third clock pulses.

12. An electronic endoscope having a flexible conduit, a video-signal processor being detachably connected thereto, said endoscope comprising:
an image sensor provided in said flexible conduit for converting an optical image into analog electric image-pixel signals;
an analog-to-digital converter that converts said analog electric image-pixel signals into digital electric image-pixel signals on a basis of a first series of clock pulses;
a memory provided in said flexible conduit that stores frequency information concerning a frequency of said first clock pulses;
a fetcher that fetches said frequency information from said memory when joining said flexible conduit to said video-signal processor;
a clock-pulse generator that outputs said first clock pulses to said analog-to-digital converter on a basis of said frequency information fetched by said fetcher for said conversion of said analog electric image-pixel signals into said digital electric image-pixel signals by said analog-to-digital converter, a number of said converted digital electric image-pixel signals included in one-horizontal-scanning-line being based upon said frequency of said first clock pulses; and
a pixel-number converter that converts said number of digital electric image-pixel signals, based upon said frequency of said first clock pulses, into another number of digital image-pixel signals so as to enable said digital electric image-pixel signals to be externally outputted on a basis of a second series of clock pulses having a frequency different from that of said first frequency.

13. An electronic endoscope as set forth in claim 12, further comprising a digital color-matrix converter that processes said digital electric image-pixel signals to thereby produce luminance signals and two kinds of color-difference signals, after said conversion of said number of digital electric image-pixel signals into said another number of digital image-pixel signals.

14. An electronic endoscope as set forth in claim 12, wherein said frequency of said first clock pulses is larger than said frequency of said second clock pulses, said conversion of said number of digital electric image-pixel signals into said another number of digital electric image-pixel signals by said pixel-number converter being carried out by a thinning-process executed by said pixel-number converter.

15. An electric endoscope as set forth in claim 14, wherein said pixel-number converter includes an eliminator that executes said thinning-process to eliminate a given number of image-pixel signals from said digital electric image-pixel signals to thin said digital electric image-pixel signals, and an arithmetic operator that executes an arithmetic operation to allow said eliminated image-pixel signals to remain in said thinned digital electric image-pixel signals.

16. An electronic endoscope as set forth in claim 14, wherein said frequency of said first clock pulses is 14.3182 MHz, said frequency of said second clock pulses is 13.5 MHz, said number of electric image-pixel signals included in one-horizontal-scanning-line is 910 pixels, and said 910 pixels are converted into 858 pixels by said pixel-number converter.

17. An electronic endoscope as set forth in claim 14, wherein said frequency of said first clock pulses is 14.75 MHz, said frequency of said second clock pulses is 13.5 MHz, said number of digital electric image-pixel signals included in one-horizontal-scanning-line is 944 pixels, and said 944 pixels are converted into 864 pixels by said pixel-number converter.

18. An electronic endoscope as set forth in claim 14, wherein said frequency of said first clock pulses is 17.0625 MHz, said frequency of said second clock pulses is 13.5 MHz; said number of digital electric image-pixel signals included in one-horizontal-scanning-line is 1092 pixels, said 1092 pixels being converted into 864 pixels by said pixel-number converter.

19. An electronic endoscope as set forth in claim 12, wherein said frequency of said first clock pulses is smaller than said frequency of said second clock pulses, said conversion of said number of digital electric image-pixel into said another number of digital electric image-pixel signals by said pixel-number converter [is] being carried out by an interpolating-process executed by said pixel-number converter.

20. An electronic endoscope as set forth in claim 19, wherein said pixel-number converter includes an interpolator that executes said interpolating-process, to interpolate a given number of image-pixel signals in said digital electric image-pixel signals, and an arithmetic operator that executes an arithmetic operation, to produce said image-pixel signals to be interpolated on a basis of said digital electric image-pixel signals.

21. An electronic endoscope as set forth in claim 19, wherein said frequency of said first clock pulses is 12.2727 MHz, said frequency of said second clock pulses is 13.5 MHz, said number of digital electric image-pixel signals included in one-horizontal-scanning-line is 780 pixels, said 780 pixels being converted into 858 pixels by said pixel-number converter.

22. An electronic endoscope comprising:
image sensor means for converting an optical image into analog electric image-pixel signals;
analog-to-digital converter means for converting said analog electric image-pixel signals into digital electric image-pixel signals on the basis of a first series of clock pulses, a number of the converted digital electric image-pixel signals included in a one-horizontal-scanning-line being based upon a frequency of said first series of clock pulses;
pixel-number converter means for converting the number of the converted digital electric image-pixel signals into another number of digital image-pixel signals so as to enable said digital electric image-pixel signals to be externally outputted on the basis of a second series of clock pulses having a frequency different from that of said first clock pulses; and a determiner that determines whether said frequency of said first clock pulses is larger than said frequency of said second clock pulses, wherein said digital electric image-pixel signals converted from said analog electric image-pixel signals by said analog-digital converter are subjected to a thinning-process executed by said pixel-number converter when it is determined by said determiner that said frequency of said first clock pulses is larger than said frequency of said second clock pulses, and said digital electric image-pixel signals converted from said analog electric image-pixel signals by said analog-digital converter are subjected to a interpolating-process executed by said pixel-number converter when it is determined by said determiner that said frequency of said first clock pulses is smaller than said frequency of said second clock pulses.

23. An electronic endoscope as set forth in claim 22, further comprising digital color-matrix converter means for processing said digital electric image-pixel signals to thereby produce luminance signals and two kinds of color-difference signals, after conversion of said number of digital electric image-pixel signals into said another number of digital image-pixel signals.

24. An electronic endoscope as set forth in claim 22, wherein said frequency of said first clock pulses is larger than said frequency of said second clock pulses, said digital electric image-pixel signals converted from said analog electric image-pixel signals by said analog-digital converter means being subjected to a thinning-process executed by said pixel-number converter means.

25. An electric endoscope as set forth in claim 24, wherein said pixel-number converter means includes eliminator means for executing said thinning-process, to eliminate a given number of image-pixel signals from said digital electric image-pixel signals to thin said digital electric image-pixel signals; and arithmetic operator means for executing an arithmetic operation to allow said eliminated image-pixel signals to remain in said thinned digital electric image-pixel signals.

26. An electronic endoscope as set forth in claim 25, wherein said frequency of said first clock pulses is 14.3182 MHz, said frequency of said second clock pulses is 13.5 MHz, said number of digital electric image-pixel signals included in one-horizontal-scanning-line is 910 pixels, said 910 pixels being converted into 858 pixels by said pixel-number converter means.

27. An electronic endoscope as set forth in claim 25, said frequency of said first clock pulses is 14.75 MHz, said frequency of said second series of clock pulses is 13.5 MHz, said number of digital electric image-pixel signals included in one-horizontal-scanning-line is 944 pixels, said 944 pixels being converted into 864 pixels by said execution of said thinning-process with said pixel-number converter means.

28. An electronic endoscope as set forth in claim 25, wherein said frequency of said first clock pulses is 17.0625 MHz, said frequency of said second clock pulses is 13.5 MHz, said number of digital electric image-pixel signals included in one-horizontal-scanning-line is 1092 pixels, said 1092 pixels being converted into 864 pixels by said execution of said thinning-process with said pixel-number converter means.

29. An electronic endoscope as set forth in claim 22, wherein said frequency of said first clock pulses is smaller than said frequency of said second clock pulses, said digital electric image-pixel signals being subjected to an interpolating-process executed by said pixel-number converter means.

30. An electronic endoscope as set forth in claim 29, wherein said pixel-number converter means includes interpolator means for executing said interpolating-process, to interpolate a given number of image-pixel signals in said digital electric image-pixel signals; and arithmetic operator means for executing an arithmetic operation, to produce said image-pixel signals to be interpolated on a basis of the digital electric image-pixel signals.

31. An electronic endoscope as set forth in claim 29, wherein said frequency of said first clock pulses is 12.2727 MHz, said frequency of said second clock pulses is 13.5 MHz, said number of digital electric image-pixel signals included in one-horizontal-scanning-line is 780 pixels, said 780 pixels being converted into 858 pixels by said execution of said interpolating-process with said pixel-number converter means.

32. An electronic endoscope, comprising:

image sensor means for converting an optical image into analog electric image-pixel signals;

analog-to-digital converter means for converting said analog electric image-pixel signals into digital electric image-pixel signals;

clock-pulse generator means for selectively outputting one of a first series of clock pulses and a second series of clock pulses to said analog-to-digital converter means for conversion of said analog electric image-pixel signals into digital electric image-pixel signals by said analog-to-digital converter means, a number of said converted digital electric image-pixel signals included in a one-horizontal-scanning-line being based upon one of a frequency of said first clock pulses and a frequency of said second clock pulses;

pixel-number converter means for converting said number of digital electric image-pixel signals, based upon one of said frequency of said first clock pulses and said frequency of said second clock pulses, into another number of digital image-pixel signals so as to enable said digital electric image-pixel signals to be externally outputted on a basis of a third series of clock pulses having a frequency larger than said frequency of said first clock pulses but smaller than said frequency of said second clock pulses; and a determiner that determines whether either said first clock pulses or said second clock pulses should be outputted from said clock-pulse generator means, wherein said digital electric image-pixel signals converted from said analog electric image-pixel signals by said analog-digital converter means are subjected to a thinning-process executed by said pixel-number converter means when it is determined by said determiner that said first clock pulses should be outputted from said clock-pulse generator means, and said digital electric image-pixel signals converted from said analog electric image-pixel signals by said analog-digital converter means are subjected to a interpolating-process executed by said pixel-number converter means when it is determined by said determiner that said second clock pulses should be outputted from said clock-pulse generator.

33. An electronic endoscope as set forth in claim 32, further comprising digital color-matrix converter means for processing said digital electric image-pixel signals to produce luminance signals and two kinds of color-difference signals, after conversion of said number of digital electric image-pixel signals into said another number of digital image-pixel signals.

34. An electronic endoscope as set forth in claim 32, wherein said frequency of said first clock pulses is larger than said frequency of said third clock pulses, so that said conversion of said number of digital electric image-pixel signals, based upon said frequency of said first clock pulses, into said another number of digital electric image-pixel signals is carried out by a thinning-process executed by said pixel-number converter means, said frequency of said second clock pulses being smaller than said frequency of said third clock pulses, so that said conversion of said number of digital electric image-pixel signals, based upon said frequency of said second clock pulses, into said another number of digital electronic image-pixel signals is carried out by an interpolating-process executed by said pixel-number converter means.

35. An electric endoscope as set forth in claim 34, wherein said pixel-number converter means comprises means for executing said thinning-process, to eliminate a predetermined number of image-pixel signals from said digital electric image-pixel signals to thin said digital electric image-pixel signals; first arithmetic operator means for executing an arithmetic operation to allow said eliminated image-pixel signals to remain in said thinned digital electric image-pixel signals; interpolator means for executing said interpolating-process, to interpolate a predetermined number of image-pixel signals in said digital electric image-pixel signals; and second arithmetic operator means for executing an arithmetic operation to produce said image-pixel signals to be interpolated, on a basis of said digital electric image-pixel signals.

36. An electronic endoscope as set forth in claim 34, wherein said frequency of said first clock pulses is 14.3182 MHz so that said number of digital electric image-pixel signals based on 14.3182 MHz is 910 pixels, said frequency of said second clock pulses is 12.2727 MHz so that said number of digital electric image-pixel signals based on 12.2727 MHz is 780 pixels, and said frequency of said third clock pulses is 13.5 MHz so that one of said 910 pixels and said 780 pixels is converted into 858 pixels, based upon a frequency of 13.5 MHz of said third clock pulses.

37. An electronic endoscope having a flexible conduit and a video-signal processor detachable connected thereto, said endoscope comprising:

image sensor means, provided in said flexible conduit, for converting an optical image into analog electric image-pixel signals;

analog-to-digital converter means for converting said analog electric image-pixel signals into digital electric image-pixel signals on a basis of a first series of clock pulses;

memory means, provided in said flexible conduit, for storing frequency information concerning a frequency of said first clock pulses;

fetcher means for fetching said frequency information from said memory means when said flexible conduit is connected to said video-signal processor;

clock-pulse generator means for outputting said first clock pulses to said analog-to-digital converter means on the basis of said frequency information fetched by said fetcher means for conversion of said analog electric image-pixel signals into said digital electric image-pixel signals by said analog-to-digital converter means, a number of said converted digital electric image-pixel signals included in one-horizontal-scanning-line being based upon said frequency of said first clock pulses; and pixel-number converter means for converting said number of digital electric image-pixel signals, based upon said frequency of said first clock pulses, into another number of digital image-pixel signals, so as to enable said digital electric image-pixel signals to be externally outputted on the basis of a second series of clock pulses having a frequency different from that of said first frequency.

38. An electronic endoscope as set forth in claim 37, further comprising a digital color-matrix converter means for processing said digital electric image-pixel signals to thereby produce luminance signals and two kinds of color-difference signals, after conversion of said number of digital electric image-pixel signals into said another number of digital image-pixel signals.

39. An electronic endoscope as set forth in claim 37, wherein said frequency of said first clock pulses is larger than said frequency of said second clock pulses, said conversion of said number of digital electric image-pixel signals into said another number of digital electric image-pixel signals by said pixel-number converter means being carried out by a thinning-process executed by said pixel-number converter means.

40. An electric endoscope as set forth in claim 39, wherein said pixel-number converter means includes eliminator means for executing said thinning-process, to eliminate a given number of image-pixel signals from said digital electric image-pixel signals to thin said digital electric image-pixel signals; and arithmetic operator means for executing an arithmetic operation, to allow said eliminated image-pixel signals to remain in said thinned digital electric image-pixel signals.

41. An electronic endoscope as set forth in claim 39, wherein said frequency of said first clock pulses is 14.3182 MHz; said frequency of said second clock pulses is 13.5 MHz; said number of digital electric image-pixel signals included in one-horizontal-scanning-line being 910 pixels, said 910 pixels being converted into 858 pixels by said pixel-number converter means.

42. An electronic endoscope as set forth in claim 39, wherein said frequency of said first clock pulses is 14.75 MHz; said frequency of said second clock pulses is 13.5 MHz; said number of digital electric image-pixel signals included in one-horizontal-scanning-line being 944 pixels, said 944 pixels being converted into 864 pixels by said pixel-number converter means.

43. An electronic endoscope as set forth in claim 39, wherein said frequency of said first clock pulses is 17.0625 MHz; said frequency of said second clock pulses is 13.5 MHz; said number of digital electric image-pixel signals included in one-horizontal-scanning-line being 1092 pixels, said 1092 pixels being converted into 864 pixels by said pixel-number converter means.

44. An electronic endoscope as set forth in claim 37, wherein said frequency of said first clock pulses is smaller than said frequency of said second clock pulses, said conversion of said number of digital electric image-pixel into said another number of digital electric image-pixel signals, by said pixel-number converter means, being carried out by an interpolating-process executed by said pixel-number converter means.

45. An electronic endoscope as set forth in claim 44, wherein said pixel-number converter means includes interpolator means for executing said interpolating-process, to interpolate a given number of image-pixel signals in the digital electric image-pixel signals; and arithmetic operator means for executing an arithmetic operation, to produce image-pixel signals to be interpolated, on the basis of said digital electric image-pixel signals.

46. An electronic endoscope as set forth in claim 44, wherein said frequency of said first clock pulses is 12.2727 MHz; said frequency of said second clock pulses is 13.5 MHz; said number of digital electric image-pixel signals included in one-horizontal-scanning-line being 780 pixels, said 780 pixels being converted into 858 pixels by said pixel-number converter means.

47. An electronic endoscope, comprising:

image sensor means for converting an optical image into analog electric image-pixel signals;

analog-to-digital converter means for converting said analog electric image-pixel signals into digital electric image-pixel signals;

clock-pulse generator means for selectively outputting one of a first series of clock pulses and a second series of clock pulses to said analog-to-digital converter means for conversion of said analog electric image-pixel signals into digital electric image-pixel signals by said analog-to-digital converter means, a number of said converted digital electric image-pixel signals included in one-horizontal-scanning-line being based upon one of a frequency of said first clock pulses and a frequency of said second clock pulses;

pixel-number converter means for converting said number of digital electric image-pixel signals, based upon one of said frequency of said first clock pulses and said frequency of said second clock pulses, into another number of digital image-pixel signals so as to enable said digital electric image-pixel signals to be externally outputted on a basis of a third series of clock pulses having a frequency larger than said frequency of said first clock pulses and said frequency of said second clock pulses; and determining means for determining whether either said first clock pulses or said second clock pulses should be outputted from said clock-pulse generator means, wherein said digital electric image-pixel signals converted from said analog electric image-pixel signals by said analog-digital converter means are subjected to a first thinning-process executed by said pixel-number converter means when it is determined by said determining means that said first clock pulses should be outputted from said clock-pulse generator means, and said digital electric image-pixel signals converted from said analog electric image-pixel signals by said analog-digital converter means are subjected to a second thinning-process executed by said pixel-number converter means when it is determined by said determining means that said second clock pulses should be outputted from said clock-pulse generator means.

48. An electric endoscope as set forth in claim 47, wherein said pixel-number converter means includes first eliminator means for executing said first thinning-process, to eliminate a predetermined number of image-pixel signals from said digital electric image-pixel signals to thin said digital electric image-pixel signals; first arithmetic operator means for executing an arithmetic operation to allow said image-pixel signals, eliminated by said first eliminator means, to remain in said thinned digital electric image-pixel signals; second eliminator means, for executing said second thinning-process, to eliminate a predetermined number of image-pixel signals from said digital electric image-pixel signals to thin said digital electric image-pixel signals; and second arithmetic operator means, for executing an arithmetic operation, to allow said image-pixel signals, eliminated by said second eliminator means, to remain in said thinned digital electric image-pixel signals.

49. An electronic endsocope as set forth in claim 47, wherein said frequency of said first clock pulses is 14.75 MHz so that the number of the digital electric image-pixel signals based on 14.75 MHz is 944 pixels, said frequency of said second clock pulses is 17.0625 MHz so that the number of digital electric image-pixel signals based on 17.0625 MHz is 1092 pixels, and said frequency of said third clock pulses is 13.5 MHz so that one of said 944 pixels and said 1092 pixels are converted into 864 pixels, based upon said frequency of 13.5 MHz of said third clock pulses.

50. An electronic endoscope, comprising:

an image sensor that converts an optical image into analog electric image-pixel signals;

an analog-to-digital converter that converts said analog electric image-pixel signals into digital electric image-pixel signals;

a clock-pulse generator that selectively outputs one of a first series of clock pulses and a second series of clock pulses to said analog-to-digital converter for conversion of said analog electric image-pixel signals into digital electric image-pixel signals by said analog-to-digital converter, a number of said converted digital electric image-pixel signals included in one-horizontal-scanning-line being based upon one of a frequency of said first clock pulses and a frequency of said second clock pulses;

a pixel-number converter that converts said number of digital electric image-pixel signals, based upon one of said frequency of said first clock pulses and said frequency of said second clock pulses, into another number of digital image-pixel signals so as to enable said digital electric image-pixel signals to be externally outputted on a basis of a third series of clock pulses having a frequency larger than said frequency of said first clock pulses and said frequency of said second clock pulses; and a determiner that determines whether either said first clock pulses or said second clock pulses should be outputted from said clock-pulse generator, wherein said wherein said digital electric image-pixel signals converted from said analog electric image-pixel signals by said analog-digital converter are subjected to a first thinning-process executed by said pixel-number converter when it is determined by said determiner that said first clock pulses should be outputted from said clock-pulse generator, and said digital electric image-pixel signals converted from said analog electric image-pixel signals by said analog-digital converter are subjected to a second thinning-process executed by said pixel-number converter when it is determined by said determiner that said second clock pulses should be outputted from said clock-pulse generator.

51. An electric endoscope as set forth in claim 50, wherein said pixel-number converter comprises a first eliminator that executes said first thinning-process, to eliminate a given number of image-pixel signals from said digital electric image-pixel signals to thin said digital electric image-pixel signals, a first arithmetic operator that executes an arithmetic operation to allow said image-pixel signals, eliminated by said first eliminator, to remain in said thinned digital electric image-pixel signals, a second eliminator that executes said second thinning-process, to eliminate a predetermined number of image-pixel signals from said digital electric image-pixel signals to thin said digital electric image-pixel signals, and a second arithmetic operator that executes an arithmetic operation to allow said image-pixel signals, eliminated by said second eliminator, to remain in said thinned digital electric image-pixel signals.

52. An electronic endoscope as set forth in claim 50, wherein said frequency of said first clock pulses is 14.75 MHz so that said number of digital electric image-pixel signals based on 14.75 MHz is 944 pixels, said frequency of said second clock pulses is 17.0625 MHz so that said number of digital electric image-pixel signals based on 17.0625 MHz is 1092 pixels, and said frequency of said third clock pulses is 13.5 MHz so that one of said 944 pixels and said 1092 pixels are converted into 864 pixels based upon said frequency of 13.5 MHz of said third clock pulses.

53. An electronic endoscope, comprising:
   an image sensor that converts an optical image into analog electric image-pixel signals;
   an analog-to-digital converter that converts said analog electric image-pixel signals into digital electric image-pixel signals;
   a clock-pulse generator that selectively outputs one of a first series of clock pulses and a second series of clock pulses to said analog-to-digital converter for conversion of said analog electric image-pixel signals into digital electric image-pixel signals by said analog-to-digital converter, a first number of said digital electric image-pixel signals included in one-horizontal-scanning-line, converted by the outputting of said first clock pulses, being based upon a frequency of said first clock pulses, a second number of said digital electric image-pixel signals included in one-horizontal-scanning-line, converted by the outputting of said second clock pulses, being based upon a frequency of said second clock pulses;
   a determiner that determines whether either said first clock pulses or said second clock pulses should be outputted from said clock-pulse generator;
   a pixel-number converter that converts said first number of digital electric image-pixel signals, based upon said frequency of said first clock pulses, into a third number of digital image-pixel signals so as to enable said digital electric image-pixel signals to be externally outputted on a basis of a third series of clock pulses having a frequency different from said frequency of said first clock pulses and said frequency of said second clock pulses, when it is determined by said determiner that said first clock pulses should be outputted from said clock-pulse generator and that converts said second number of digital electric image-pixel signals, based upon said frequency of said first clock pulses, into said third number of digital image-pixel signals so as to enable said digital electric image-pixel signals to be externally outputted on a basis of said third series of clock pulses, when it is determined by said determiner that said first clock pulses should be outputted from said clock-pulse generator.

* * * * *